US011853650B2

(12) United States Patent
Niehaus et al.

(10) Patent No.: US 11,853,650 B2
(45) Date of Patent: *Dec. 26, 2023

(54) AUDIO PRESENTATION OF CONVERSATION THREADS

(71) Applicant: Microsoft Technology Licensing, LLC, Redmond, WA (US)

(72) Inventors: August Kathryn Niehaus, Bellevue, WA (US); Saurabh Choudhury, Bothell, WA (US); Eugene Y. Suh, Bellevue, WA (US); Gunjan Sood, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,491

(22) Filed: Feb. 9, 2022

(65) Prior Publication Data

US 2022/0269479 A1    Aug. 25, 2022

Related U.S. Application Data

(63) Continuation of application No. 16/436,608, filed on Jun. 10, 2019, now Pat. No. 11,269,590.

(51) Int. Cl.
  *G06F 3/16*     (2006.01)
  *H04L 51/216*   (2022.01)

(52) U.S. Cl.
  CPC .......... *G06F 3/167* (2013.01); *H04L 51/216* (2022.05)

(58) Field of Classification Search
  None
  See application file for complete search history.

(56) References Cited

U.S. PATENT DOCUMENTS

| 2003/0023688 A1* | 1/2003 | Denenberg | H04L 9/40 709/206 |
| 2005/0004990 A1* | 1/2005 | Durazo | G06Q 10/107 709/206 |

(Continued)

*Primary Examiner* — Henry Orr
(74) *Attorney, Agent, or Firm* — Alleman Hall Creasman & Tuttle LLP

(57) ABSTRACT

In an example, a computing system receives an instruction to initiate audio presentation of electronic communications for a recipient. Responsive to the instruction, the computing system audibly outputs each unreviewed electronic communication in a most-recent conversation thread including a most-recent set of unreviewed, reply-linked electronic communications for the recipient. Each unreviewed electronic communication in the most-recent conversation thread may be audibly output in a chronological-sequential order beginning with an oldest unreviewed electronic communication and continuing to a most-recent unreviewed electronic communication. Responsive to completing audible output of the most-recent unreviewed electronic communication from a conversation thread, the computing device audibly outputs each unreviewed electronic communication in a next-most-recent conversation thread including a next-most-recent set of unreviewed, reply-linked electronic communications for the recipient. Each unreviewed electronic communication in the next-most-recent conversation thread may be audibly output in a chronological-sequential order beginning with an oldest unreviewed electronic communication.

20 Claims, 22 Drawing Sheets

(56) References Cited

U.S. PATENT DOCUMENTS

| | | | | |
|---|---|---|---|---|
| 2009/0086937 | A1* | 4/2009 | Horn | H04M 3/5315 |
| | | | | 379/88.13 |
| 2011/0231499 | A1* | 9/2011 | Stovicek | H04L 51/42 |
| | | | | 709/206 |
| 2013/0204414 | A1* | 8/2013 | Yoshikawa | G11B 27/322 |
| | | | | 700/94 |
| 2013/0275138 | A1* | 10/2013 | Gruber | G10L 13/00 |
| | | | | 704/260 |
| 2016/0286002 | A1* | 9/2016 | Marra | H04L 51/52 |
| 2016/0342571 | A1* | 11/2016 | Lane | H04L 51/216 |
| 2017/0111305 | A1* | 4/2017 | Bastide | H04L 51/52 |
| 2019/0116144 | A1* | 4/2019 | Ghotbi | G06F 3/167 |
| 2019/0236417 | A1* | 8/2019 | Yun | G06V 10/7788 |
| 2019/0386937 | A1* | 12/2019 | Kim | G06F 40/117 |
| 2020/0026399 | A1* | 1/2020 | Nalliah | G06F 3/0482 |

* cited by examiner

| CONDITION | OUTPUT |
| --- | --- |
| SESSIONS GREATER THAN 2 MINUTES | "THIS'LL JUST TAKE A COUPLE OF MINUTES" |
| SESSIONS GREATER THAN 2 MINUTES, BUT LESS THAN 5 MINUTES | "THIS'LL JUST TAKE A FEW MINUTES" |
| SESSIONS 5-7 MINUTES | "THIS'LL TAKE ABOUT 5 MINUTES" |
| SESSIONS 8-12 MINUTES | "THIS'LL TAKE ABOUT 9 MINUTES" |
| SESSIONS 13-17 MINUTES | "THIS'LL TAKE ABOUT 15 MINUTES" |
| SESSIONS 18-23 MINUTES | "THIS'LL TAKE ABOUT 20 MINUTES" |
| SESSIONS 24 MINUTES OR GREATER | "THIS'LL TAKE MORE THAN HALF AN HOUR" |

FIG. 9A

| CONDITION | OUTPUT |
|---|---|
| TO ONLY RECIPIENT | "JUST TO YOU" |
| TO RECIPIENT + 1 OTHER RECIPIENT | "TO YOU AND DAVID" |
| TO RECIPIENT + RECIPIENT'S MANAGER | "TO YOU AND YOUR MANAGER" |
| TO RECIPIENT + UP 20 OTHER RECIPIENTS | "TO 6 PEOPLE";<br>"TO 16 PEOPLE" |
| TO RECIPIENT + UP 20 OTHER RECIPIENTS, INCLUDING RECIPIENT'S MANAGER | "TO 17 PEOPLE INCLUDING YOUR MANAGER" |
| TO RECIPIENT + 21 TO 100 OTHER RECIPIENTS | "TO A LARGE GROUP" |
| TO RECIPIENT + GREATER THAN 100 OTHER RECIPIENTS | "TO A HUGE GROUP" |
| TO 1 GROUP THAT INCLUDES THE RECIPIENT | "TO GROUP ABC" |
| TO MULTIPLE GROUPS THAT INCLUDES THE RECIPIENT | "TO THREE GROUPS" |
| TO THE RECIPIENT + 1 GROUP | "TO GROUP ABC AND YOU" |
| TO 1 GROUP THAT INCLUDES THE RECIPIENT + 1 OTHER RECIPIENT | "TO GROUP ABC AND DAVID" |
| TO 1 GROUP THAT INCLUDES THE RECIPIENT + 2 OTHER RECIPIENTS | "TO GROUP ABC AND SOME OTHERS" |
| TO THE RECIPIENT + MULTIPLE GROUPS | "TO YOU AND THREE GROUPS" |
| TO MULTIPLE GROUPS THAT INCLUDES THE RECIPIENT + 1 OTHER RECIPIENT | "TO THREE GROUPS AND DAVID" |
| TO MULTIPLE GROUPS THAT INCLUDES THE RECIPIENT + 2 OTHER RECIPIENTS | "TO THREE GROUPS AND SOME OTHERS" |

FIG. 9B

| CONDITION | OUTPUT |
|---|---|
| CONVERSATION HAS JUST 1 UNREAD MESSAGE | N/A; NO ADDITIONAL CONTEXT NEEDED |
| CONVERSATION HAS 2-5 UNREAD MESSAGES | "THERE ARE 4 EMAILS IN A CONVERSATION ABOUT…" |
| CONVERSATION HAS 6+ UNREAD MESSAGES | "THERE'S A LONG CONVERSATION ABOUT…" |

FIG. 9C

| CONDITION | OUTPUT |
|---|---|
| SOME RECIPIENTS WERE JUST ADDED IN RELATION TO A PREVIOUS MESSAGE | "AND ADDED 3 PEOPLE" |
| SOME RECIPIENTS WERE JUST REMOVED IN RELATION TO PREVIOUS MESSAGE | "AND REMOVED 6 PEOPLE" |
| ALL OTHER RECIPIENTS EXCEPT RECIPIENT WERE REMOVED IN RELATION TO PREVIOUS MESSAGE | "JUST TO YOU" |

FIG. 9D

| CONDITION | OUTPUT |
|---|---|
| A MESSAGE WILL TAKE 30 SECONDS OR LESS TO READ | N/A; NO ADDITIONAL WARNING NEEDED |
| A MESSAGE WILL TAKE GREATER THAN 30 SECONDS AND UP TO 1 MINUTE TO READ | "IT'S A LONG ONE" |
| A MESSAGE WILL TAKE GREATER THAN 1 MINUTE TO READ | "IT'S A REALLY LONG ONE" |

FIG. 9E

| | |
|---|---|
| ASSISTANT: | Hi there, Sam! I've got 6 conversations and one other update for you right now. This'll take about 5 minutes. |
| | First up, there's a long conversation about "World Cup office pool". Feel free to interrupt. |
| | A few hours ago, Greg sent the first email to a large group, with an attachment. |
| | It says, "GOAL! Can you believe it's already World Cup time? I want to start an office pool so I am reaching out.." |
| USER: | Hey Assistant, next conversation. |
| ASSISTANT: | Next, there are 3 emails in a conversation about "HR incident". |
| | Last night, Sara sent the first email to 6 people, including your manager. |
| | It says, "We had a serious incident today and we need to discuss how we're going to handle this going forward. There's been talk of a firing and I want that to stop immediately." {listening audible indicator and then 3 seconds of silence} |
| | Next, also last night, Harris replied. |
| | It says, "Sara, I need to bring up a very serious concern…" |
| USER: | Hey Assistant, next. |
| ASSISTANT: | Finally, Sara replied and removed 3 people. |
| | It says, "I'm not sure we can proceed at this point. We'll need to reevaluate. I'll connect with you three when I get in the office today." |
| | That's all for that conversation. Flag the last one, or move on? {listening audible indicator and then 5 seconds of silence} |
| USER: | <says nothing> |

CONTINUED FROM FIG. 10A

| | |
|---|---|
| ASSISTANT: | Next, there are 2 emails in a thread about "Company announcement". |
| | Last night, Satya sent the first email to the "Company – All" group. It's a really long one. |
| | It says, "Good morning, Company. I wanted to send a note to share the latest updates about our acquisition..." |
| USER: | Hey Assistant, flag that. |
| ASSISTANT: | I flagged it for you. {flag audible indicator} |
| | Next up, there are 3 emails in a conversation about "Pizza party". |
| | Last night, Dan sent the first email to 10 people, mentioning you. |
| | It says, "Folks, Sam is on the hook for hosting this week's pizza party!" {listening audible indicator and then 3 seconds of silence} |
| | Next, a few hours ago, Heather replied, with an attachment. |
| | It says, "I am so excited! Adding a picture of my favorite fictional pizza." {listening audible indicator and then 3 seconds of silence} |
| | Finally, about an hour ago, Dan replied, just to you. |
| | It says, "Can you please make sure to get me a vegan pizza?" |
| | That's the end of that conversation. {listening audible indicator and then 5 seconds of silence} |
| USER: | Flag it. |

CONTINUED FROM FIG. 10B

| | |
|---|---|
| ASSISTANT: | I flagged it for you. |
| | Next up, a couple of hours ago, Varun wrote asking about "Sync up?" just to you. |
| | It says, "Hey, Haven't talked in a while. Want to get together for lunch or coffee soon? " |
| | That's the whole email. {listening audible indicator and then 5 seconds of silence} |
| USER: | Flag it. |
| ASSISTANT: | I flagged it for you. |
| | A few hours ago, Noelle replied to 3 people about "Latest files", with an attachment. |
| | It says, "Here you go!" |
| | That's all for that email. {listening audible indicator and then 5 seconds of silence} |
| USER: | <says nothing> |
| ASSISTANT: | Just one more thing. You've got a package from Company XYZ on its way. |
| | That's all for now. |

FIG. 10C

| | |
|---|---|
| USER: | Hey Assistant, what emails do I have? |
| ASSISTANT: | You've got 3 new emails in the last hour: 1 from Jade just to you, and one each from Ruby, and Trent. Which sender do you wanna hear more about? |
| USER: | Jade. |
| ASSISTANT: | Jade emailed you about "Touching letter I found in Grandma's attic". It's a really long one. Wanna hear it? |
| USER: | Yes. |
| ASSISTANT: | It says, "Hi Sam, I wanted to send you this really sweet letter from my Grandma to my Grandpa..." <br><br> There's more to this email, including some visual content, so you'll need a screen. What should I do with this? Reply to the sender or nothing? |
| USER: | Nothing. |
| ASSISTANT: | {cancel audible indicator} |

FIG. 10D

| | |
|---|---|
| USER: | Hey Assistant, what emails do I have? |
| ASSISTANT: | You've got 10 emails, 3 of which you might wanna hear. Should I go through them? |
| USER: | Yes. |
| ASSISTANT: | There are 2 emails in a conversation about "Q4 customer results". The most recent is from Rita. What do you wanna do with these? |
| USER: | Hear them. |
| ASSISTANT: | First, a few hours ago, Kenneth forwarded the email to 6 people marked important, with an attachment. It says, "This looks like important stuff."<br><br>Then, about 15 minutes ago, Rita sent a short reply. The message says, "Thanks for sending, Kenneth!"<br><br>That's the whole conversation. What would you like to do with it? |
| USER: | Flag it. |
| ASSISTANT: | I flagged it for you. {flag audible indicator}<br><br>About an hour ago, Rita emailed about "Pre-meeting game plan" to 4 people mentioning you. Anything for this one? |
| USER: | Read it, please. |
| ASSISTANT: | It says, "Howdy team, We are coming out of Q3 really strong…"<br><br>What do you wanna do with this one? |
| USER: | Nothing. |
| ASSISTANT: | Those were the ones that looked important. Wanna hear about the other 9 emails you've got? |
| USER: | Nah. |
| ASSISTANT: | No worries. |

FIG. 10E

| USER: | Hey Assistant, did Dave email me? |
|---|---|
| ASSISTANT: | Yes, about 20 minutes ago, Dave sent a short reply about "Rescheduling the morale event" just to you. |
| | It says, "Do you mind pushing the morale event out by a couple of weeks?" |
| | What would you like to do with this? |
| USER: | Nothing. |
| ASSISTANT: | No worries. |

FIG. 10F

| ASSISTANT: | Hi Mary. You've got 5 new emails, including one from Dave. How can I help? |
|---|---|
| USER: | What did Dave say? |
| ASSISTANT: | About 20 minutes ago, Dave sent a short reply about "Rescheduling the morale event" just to you. |
| | It says, "Do you mind pushing the morale event out by a couple of weeks?" |
| | What would you like to do with this? |
| USER: | Flag it. |
| ASSISTANT: | I'll flag it for you. {flag audible indicator} |
| | What else can I do? |
| USER: | What's the weather in... |

FIG. 10G

| |  |
|---|---|
| USER: | Hey Assistant, what emails do I have? |
| ASSISTANT: | Hey Sam, you've got 2 emails, but they don't look important. Still wanna hear about them? |
| USER: | No thanks. |
| ASSISTANT: | Glad to hear it. |

FIG. 10H

| |  |
|---|---|
| USER: | Hey Assistant, do I have any new emails? |
| ASSISTANT: | There's nothing in your inbox since you last checked. |

FIG. 10I

| | |
|---|---|
| USER: | Hey Assistant, email Jackie an update on the kids. |
| ASSISTANT: | Sure, what should your email say? |
| USER: | Kids should be at school around 8 this morning and you can pick them up any time after 4, thank you! |
| ASSISTANT: | Alright, I'll email Jackie Lucia about "An update on the kids," saying, "Kids should be at school around 8 this morning and you can pick them up any time after 4 thank you!" Ready to send it? |
| USER: | Yes. |
| ASSISTANT: | Excellent, I've sent that. {success audible indicator} |

FIG. 10J

| | |
|---|---|
| ASSISTANT: | ...with updates to Satya next week." {bumper} Anything for this one? |
| USER: | Reply. |
| ASSISTANT: | OK, what's your short reply? |
| USER: | Sounds good, I'll have my portion ready by noon tomorrow for sure. |
| ASSISTANT: | Alright, you wanna email Brett saying, "Sounds good I'll have my portion ready by noon tomorrow." Want to send it? |
| USER: | Yep. |
| ASSISTANT: | Great, I've sent it. {success audible indicator}<br><br>Next, about half an hour ago, Peggy replied about... |

FIG. 10K

| | |
|---|---|
| ASSISTANT: | "...Let me know which organization you want to help." {bumper} Anything for this? |
| USER: | Reply all. |
| ASSISTANT: | OK, tell me your short reply. |
| USER: | I would definitely suggest Homeward Pet, they're an amazing charity and we can play with puppies! |
| ASSISTANT: | OK, I'll send a reply to Kenneth Fountain and 5 others with the message, "I would definitely suggest Homeward Pet they're an amazing charity and we can play with puppies!" Ready to send it? |
| USER: | Yes. |
| ASSISTANT: | Great, I've sent that. {success audible indicator}<br><br>Next, about an hour ago, Hannah sent a short email about... |

FIG. 10L

| | |
|---|---|
| USER: | Hey Assistant, tell me about my emails. |
| ASSISTANT: | There's one email you might wanna hear.<br><br>A few minutes ago, Jeannine sent a short email about "Final design revs" to 14 people, with an attachment. What would you like to do with this one? |
| USER: | Forward it to Joseph. |
| ASSISTANT: | And, what's the message to go with it? |
| USER: | Here's what you were waiting for. |
| ASSISTANT: | Alright, I'll forward "Final design revs" to Joseph Carrera, with the message "Here's what you were waiting for." Send it or change the message? |
| USER: | Send it. |
| ASSISTANT: | Excellent, I've sent it. |

FIG. 10M

| | |
|---|---|
| USER: | Hey Assistant, do I have any email from Luis? |
| ASSISTANT: | A few minutes ago, Luis replied about "Mary's sleepover party!" to 5 people. What would you like to do with this one? |
| USER: | Hear it. |
| ASSISTANT: | It says, "I'm able to bring Tanya over around 4, after she's done with soccer practice. I can also bring some cookies and we will have a present for Mary." |
| | Would you like to do anything with this? {listening audible indicator} |
| USER: | Reply. |
| ASSISTANT: | OK, tell me your short reply. |
| USER: | Sounds good Luis, we'll plan to see you then. Let me know if anything changes. |
| ASSISTANT: | OK, I'll email Luis Herrera saying, "Sounds good Luis we'll plan to see you then let me know if anything changes." Want to send it? |
| USER: | Nope!! |
| ASSISTANT: | I'll save it as a draft for you. |

FIG. 10N

| | |
|---|---|
| ASSISTANT: | Hey Laura, you've got 5 new emails, including one from Jade. How can I help? |
| USER: | Read the one from Jade. |
| ASSISTANT: | About an hour ago, Jade emailed about "Puppy update" just to you, with an attachment. |
| | It says, "Snapped some more shots of the cuties this morning. So happy to see them on their feet and running around like little terrors! ..." |

FIG. 10O

| | |
|---|---|
| USER: | Hey Assistant, what emails do I have? |
| ASSISTANT: | You've got 6 emails you might wanna hear right now. |
| | First, about 10 minutes ago, Nicki changed the time for "Website refresh brainstorm" from 10 AM to 9 AM. That means you're double-booked at 10, with "Customer promise session" at the same time. Would you like to accept this meeting? |
| USER: | Yes, tentatively. |
| ASSISTANT: | I'll let Nicki know you might make it. |
| | Next, about an hour ago, Trevor invited you to "Pre-conference huddle" at 9 AM. You don't have any conflicts then. Wanna accept this meeting? |
| USER: | Yes. |
| ASSISTANT: | I'll let Trevor know you'll make it. |
| | Next, a few hours ago, Kenneth forwarded an email... |

FIG. 10P

AUDIO PRESENTATION OF CONVERSATION THREADS

CROSS REFERENCE TO RELATED APPLICATIONS

This application is a continuation of U.S. patent application Ser. No. 16/436,608, filed Jun. 10, 2019, the entirety of which is hereby incorporated herein by reference for all purposes.

BACKGROUND

Communication networks support a broad array of electronic communications among users. Text-based electronic communications may take a variety of different forms, including email, text/SMS messages, real-time/instant messages, multimedia messages, social networking messages, messages within multi-player video games, etc. Users may read and type responses to these forms of electronic communications via a personal electronic device, such as a mobile device or desktop computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In an example, a computing system receives an instruction to initiate audio presentation of electronic communications for a recipient. Responsive to the instruction, the computing system audibly outputs each unreviewed electronic communication in a most-recent conversation thread including a most-recent set of unreviewed, reply-linked electronic communications for the recipient. Each unreviewed electronic communication in the most-recent conversation thread may be audibly output in a chronological-sequential order beginning with an oldest unreviewed electronic communication and continuing to a most-recent unreviewed electronic communication. Responsive to completing audible output of the most-recent unreviewed electronic communication from a conversation thread, the computing device audibly outputs each unreviewed electronic communication in a next-most-recent conversation thread including a next-most-recent set of unreviewed, reply-linked electronic communications for the recipient. Each unreviewed electronic communication in the next-most-recent conversation thread may be audibly output in a chronological-sequential order beginning with an oldest unreviewed electronic communication and continuing to a most-recent unreviewed electronic communication.

BRIEF DESCRIPTION OF THE DRAWINGS

FIGS. 9A-9E depict tables in which example audible outputs by a personal assistant device are provided for a range of conditions.

FIGS. 10A-10P depict example dialogs between a user and a personal assistant device.

DETAILED DESCRIPTION

The use of text-based electronic communications such as email, text messaging, and instant messaging has grown to become a primary mode of communication in modern society. Mobile computing devices have enabled people to receive their electronic communications at virtually any time and location. As people go about their day, they may be frequently interrupted by the need or desire to review new electronic communications. Visual consumption of text and multimedia content through graphical user interfaces may distract people from simultaneously performing other tasks or may preclude people from performing tasks until after the electronic communications have been visually reviewed. For example, while operating a vehicle, it may be impossible or dangerous for a person to visually review new text-based communications.

According to an aspect of the present disclosure, the use of graphical user interfaces to present text and multimedia content of electronic communications may be augmented or replaced by audible presentation of the electronic communications in a manner that provides users with context for the presentation experience and control over the audible presentation. Such an audible presentation may provide a user experience that is commensurate with or improved over the visual consumption of the electronic communications, while enabling users to simultaneously perform tasks that are difficult or impossible to perform while using a graphical user interface. In essence, the disclosed audible presentation can translate text-based communications into an experience similar to listening to a podcast.

Figure 1:
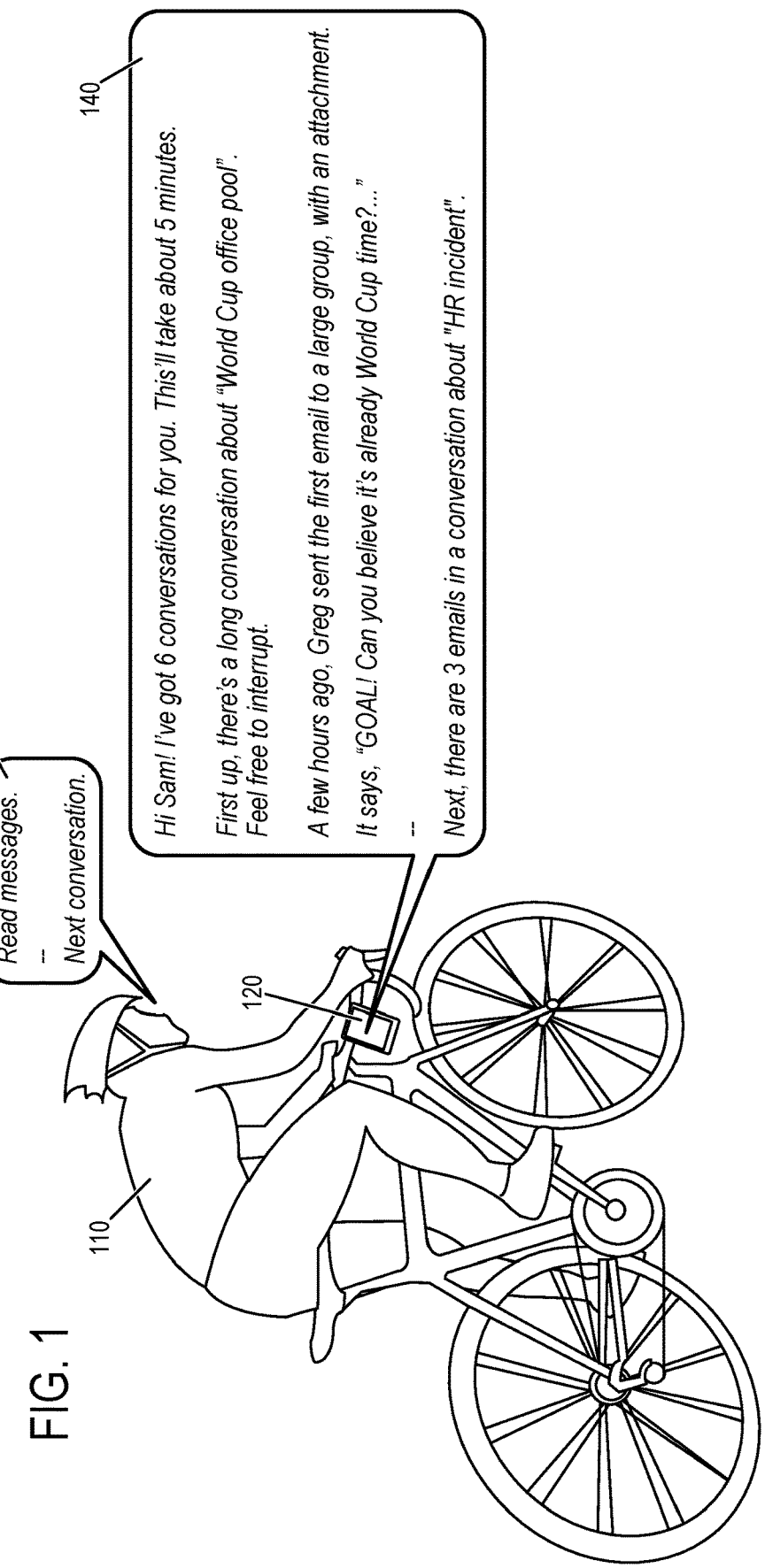
FIG. 1 depicts an example interaction between a user and a personal assistant device.

FIG. 1 depicts an example interaction 100 between a user 110 and a personal assistant device 120. In this example, user 110 is commuting to work by bicycle while interacting with personal assistant device 120 through user speech 130. Personal assistant device 120 in this example takes the form of a mobile computing device. In response to spoken commands of user speech 130, personal assistant device 120 may output audio information to user 110 as device speech 140. This is an example of a hands-free, display-free interaction that enables the user to engage in tasks, such as commuting to work by bicycle, while simultaneously processing electronic communications.

As shown in user speech 130, user 110 begins a dialog with personal assistant device 120 by speaking the command "Read messages." In response to the spoken command of the user, in device speech 140, personal assistant device 120 outputs audio information that includes: "Hi Sam! I've got 6 conversations for you. This'll take about 5 minutes." In this portion of device speech 140, personal assistant device 120 outputs audio information in the form of natural language that greets user 110 by the user's name (i.e., "Sam"), identifies a quantity (i.e., "6") of conversation threads that contain unreviewed electronic communications for the user, and identifies a duration of time (i.e., "about 5 minutes") for the user to review the conversation threads through audible output of the contents of the electronic communications. Thus, user 110 is informed by personal assistant device 120 as to the anticipated duration of an audio presentation of the unreviewed electronic communications prior to progressing through the audio presentation, thereby enabling the user to make informed decisions as to whether particular electronic communications should be reviewed or skipped.

Continuing with the example dialog of FIG. 1, personal assistant device 120 continues by outputting a summary of a first conversation thread to user 110, which identifies a quantity and/or duration of unreviewed electronic communications of the conversation thread (i.e., "long") and identifies a subject of the conversation thread (i.e., "World Cup office pool"). Thus, user 110 is informed as to the subject and estimated time for reviewing unreviewed electronic communications of the first conversation thread prior to progressing through an audio presentation of the first conversation thread. Additionally, personal assistant device 120 indicates to user 110 that the user is "free to interrupt", which informs the user that spoken commands by the user may be used to advance or interrupt audio presentation of the first conversation thread.

Next, personal assistant device 120 outputs a summary of a first electronic communication of the first conversation thread to user 110, which identifies a relative time (i.e., "a few hours ago") that the first electronic communication was received, identifies a sender of the first electronic communication (i.e., "Greg"), identifies a type of the first electronic communication (i.e., "email"), identifies a quantity of other recipients or the audience of the first electronic communication (i.e., "a large group"), identifies the presence of an attachment to the first electronic communication (i.e., "with an attachment"), and identifies at least a portion of text content of a message of the first electronic communication (e.g., "Goal! Can you believe it's already World Cup time? . . . ").

In this example, upon hearing a portion of the text content of the first electronic communication, in user speech 130 user 110 speaks the command "Next conversation." Responsive to this spoken command by user 110, personal assistant device 120 advances the audio presentation of the unreviewed electronic communications to a second conversation thread, thereby skipping audio presentation of remaining unreviewed electronic communications of the first conversation thread. For example, personal assistant device 120 responds to user 110 by outputting a summary of the second conversation thread, which identifies a quantity of unreviewed electronic communications of the second conversation thread (i.e., "3"), identifies a type of electronic communications of the second conversation thread (i.e., "email"), and identifies a subject of the second conversation thread (i.e., "HR incident").

Personal assistant device 120 may progress through conversation threads in the manner described above until all the unreviewed electronic communications have been reviewed by user 110 or the user preemptively elects to stop the dialog. By personal assistant device 120 summarizing conversation threads and their contents, user 110 is provided with sufficient information to make informed decisions regarding whether a particular conversation thread or electronic communication should be reviewed by the user in the current session. In an example in which user 110 does not advance or interrupt audio presentation of unreviewed electronic communications, the audio presentation by personal assistant device 120 will conclude in approximately the duration of time (e.g., "5 minutes") identified by the personal assistant device. However, by advancing the audio presentation, user 110 may review electronic communications within a shorter time period.

Figure 2:
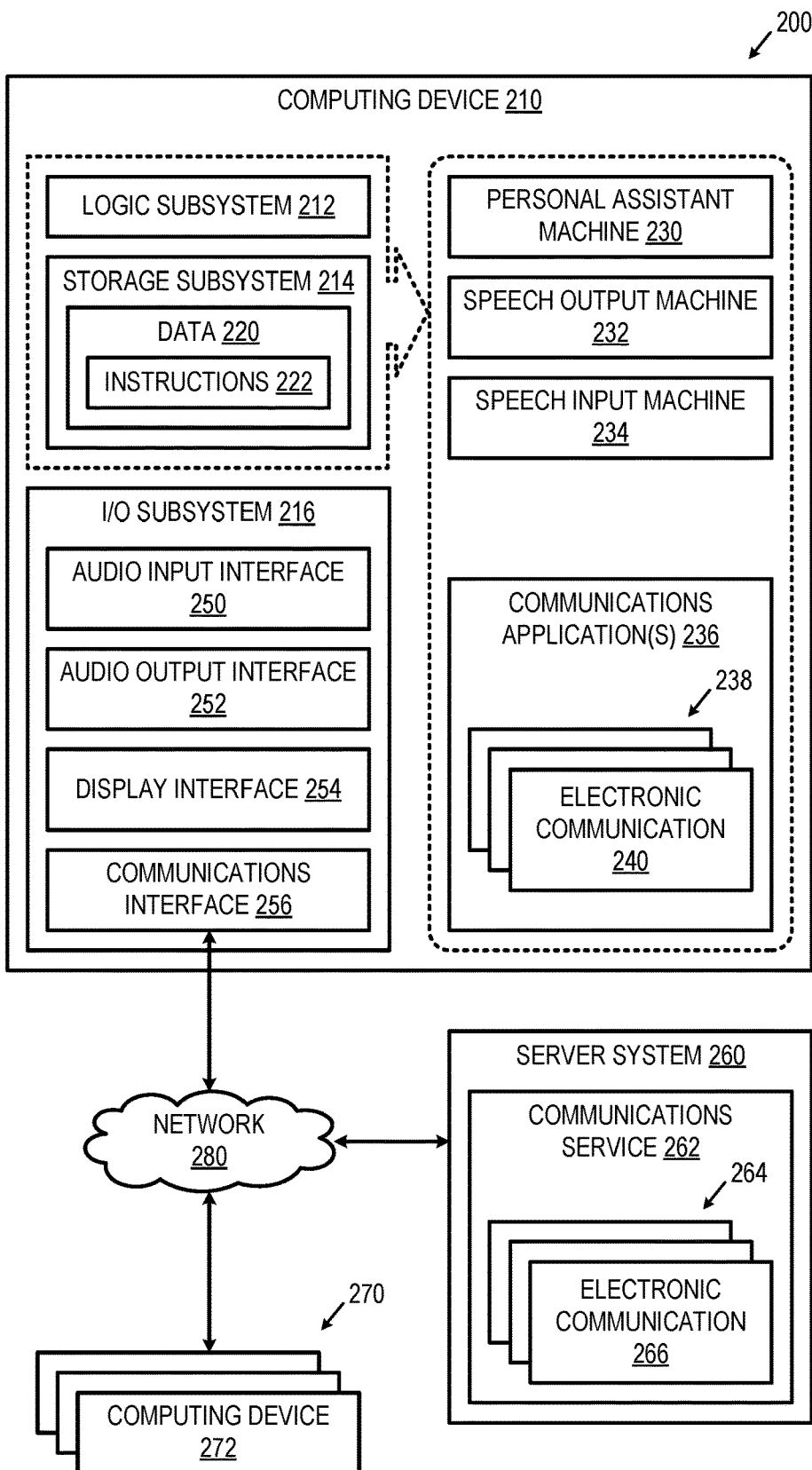
FIG. 2 schematically depicts an example computing system.

FIG. 2 schematically depicts an example computing system 200, including a computing device 210. Computing device 210 may take the form of a mobile computing device, a wearable computing device, a computing device integrated with a vehicle, a desktop computing device, a household appliance computing device, or other suitable device, as examples. Personal assistant device 120 of FIG. 1 is one example of computing device 210. Computing device 210 includes a logic subsystem 212, a storage subsystem 214, an input/output (I/O) subsystem 216, and/or other suitable components not shown in FIG. 2.

Logic subsystem 212 includes one or more physical devices (e.g., a processor) configured to execute instructions. Storage subsystem 214 includes one or more physical devices (e.g., memory) configured to hold data 220, including instructions 222 executable by logic subsystem 212 to implement the methods and operations described herein. Additional aspects of logic subsystem 212 and storage subsystem 214 are described below.

As shown in FIG. 2, logic subsystem 212 and storage subsystem 214 may cooperate to instantiate one or more functional components, such as a personal assistant machine 230, a speech output machine 232, a speech input machine 234, one or more communications applications 236, and/or other suitable components. As used herein, the term "machine" may be used to collectively refer to a combination of instructions 222 (e.g., firmware, software, etc.) with hardware and/or other suitable components that cooperate to provide the described functionality. While personal assistant machine 230, speech output machine 232, speech input machine 234, and/or communications applications 236 are described as being instantiated by cooperation of logic subsystem 212 and storage subsystem 214, in at least some examples, one or more of personal assistant machine 230, speech output machine 232, speech input machine 234, and/or communications applications 236 may be instantiated in whole or in part by a remote computing device or system, such as a server system 260. Accordingly, the methods or operations described herein may be performed locally at computing device 210, remotely at server system 260, or may be distributed between one or more computing device (s) 210 and/or one or more server system(s) 260.

Personal assistant machine 230 may engage in a dialog with a user by receiving and processing spoken commands of the user to perform tasks, including outputting information to the user. As an example, personal assistant machine 230 may output an audio presentation of a plurality of conversation threads and/or electronic communications for a recipient according to a presentation order. Personal assistant machine 230 may include natural language processing, thereby supporting a natural language interface by which a user may interact with computing device 210. A device, such as computing device 210, that implements personal assistant machine 230 may be referred to as a personal assistant device.

Speech output machine 232 receives data, such as machine-readable data and/or text-based data from personal assistant machine 230 to be output to the user, and converts such data into audio data containing speech having natural language components. In an example, speech output machine 232 may provide text-to-speech conversion. For example, personal assistant machine 230 may provide select portions of text content of an electronic communication to speech output machine 232 to convert the text content into an audible output of the text content for audible consumption by the user. In FIG. 1, for example, personal assistant device 120 outputs "GOAL! Can you believe it's already World Cup time?", which is an audible output of text content of an electronic communication of which user 110 is a recipient.

Speech input machine 234 receives audio data representing human speech, and converts the audio data into machine-readable data and/or text data that is usable by personal assistant machine 230 or other suitable components of computing device 210. In an example, speech input machine 232 may provide speech-to-text conversion. In FIG. 1, for example, personal assistant device receives and processes the spoken commands of user 110, including "Read messages" and "Next conversation" via speech input machine 234.

The one or more communications applications 236 may support the sending and receiving of electronic communications 238, of which electronic communication 240 is an example. A communication application may support one or more types of electronic communications, including email, text/SMS messages, real-time/instant messages, multimedia messages, social networking messages, messages within multi-player video games, and/or any other type of electronic communication. Personal assistant machine 230 may interface with communications applications 236, enabling the personal assistant machine to receive, process, and send electronic communications of one or more different types on-behalf of a user.

I/O subsystem 216 may include one or more of an audio input interface 250, an audio output interface 252, a display interface 254, a communications interface 256, and/or other suitable interfaces.

Computing device 210 receives audio data representing audio captured via audio input interface 250. Audio input interface 250 may include one or more integrated audio microphones and/or may interface with one or more peripheral audio microphones. For example, computing device 210 may receive audio data representing user speech captured via audio input interface 250, such as user speech 130 of FIG. 1. Audio data from audio input interface 250 may be provided to speech input machine 234 and/or personal assistant machine 230 for processing. Audio input interface 250 may be omitted in at least some examples.

Computing device 210 outputs audio representing audio data via audio output interface 252. Audio output interface 252 may include one or more integrated audio speakers and/or may interface with one or more peripheral audio speakers. For example, computing device 210 may output an audio representation of speech having natural language components via audio output interface 252, such as device speech 140 of FIG. 1. Audio data may be provided by speech output machine 232, personal assistant machine 230, or other suitable component of computing device 210 to audio output interface 252 for output as an audible output of the audio data. Audio output interface 252 may be omitted in at least some examples.

Computing device 210 may output graphical content representing graphical data via display interface 254. Display interface 254 may include one or more integrated display devices and/or may interface with one or more peripheral display devices. Display interface 254 may be omitted in at least some examples.

Computing device 210 may communicate with other devices such as server system 260 and/or other computing devices 270 via communications interface 256, enabling computing device 210 to send electronic communications to and/or receive electronic communications from the other devices. Communications interface 256 may include one or more integrated transceivers and associated communications hardware that support wireless and/or wired communications according to any suitable communications protocol. For example, communication interface 256 may be configured for communication via a wireless or wired telephone network and/or a wireless or wired personal-area network, local-area network, and/or wide-area network (e.g., the Internet, a cellular network, or a portion thereof) via a communication network 280. Communications interface 256 may be omitted in at least some examples.

I/O subsystem 216 may further include one or more additional input devices and/or output devices in integrated and/or peripheral form. Additional examples of input devices include user-input devices such as a keyboard, mouse, touch screen, touch pad, game controller, etc., and/or inertial sensors, global positioning sensors, cameras, optical sensors, etc. Additional examples of output devices include vibration motors and light-emitting indicators.

Computing system 200 may further include server system 260 of one or more server computing devices. Computing system 200 may further include a plurality of other computing devices 270 of which computing device 272 is an example. Server system 260 may host a communications service 262 that receives, processes, and sends electronic communications between or among senders and recipients addressed by the electronic communications. For example, users may operate computing devices 210 and 270 to send or receive electronic communications via communications service 262. Communications service 262 is depicted including a plurality of electronic communications 264 of which electronic communication 266 is an example. Electronic communication 266 may be received from computing device 272 via network 280 for processing and/or delivery to computing device 210 via network 280 in an example. One or more of communications applications 236 may be configured for coordinated operation with communications service 262 enabling electronic communications to be sent, received, and/or processed for senders and recipients as users of computing devices 210 and 270.

Figure 3:
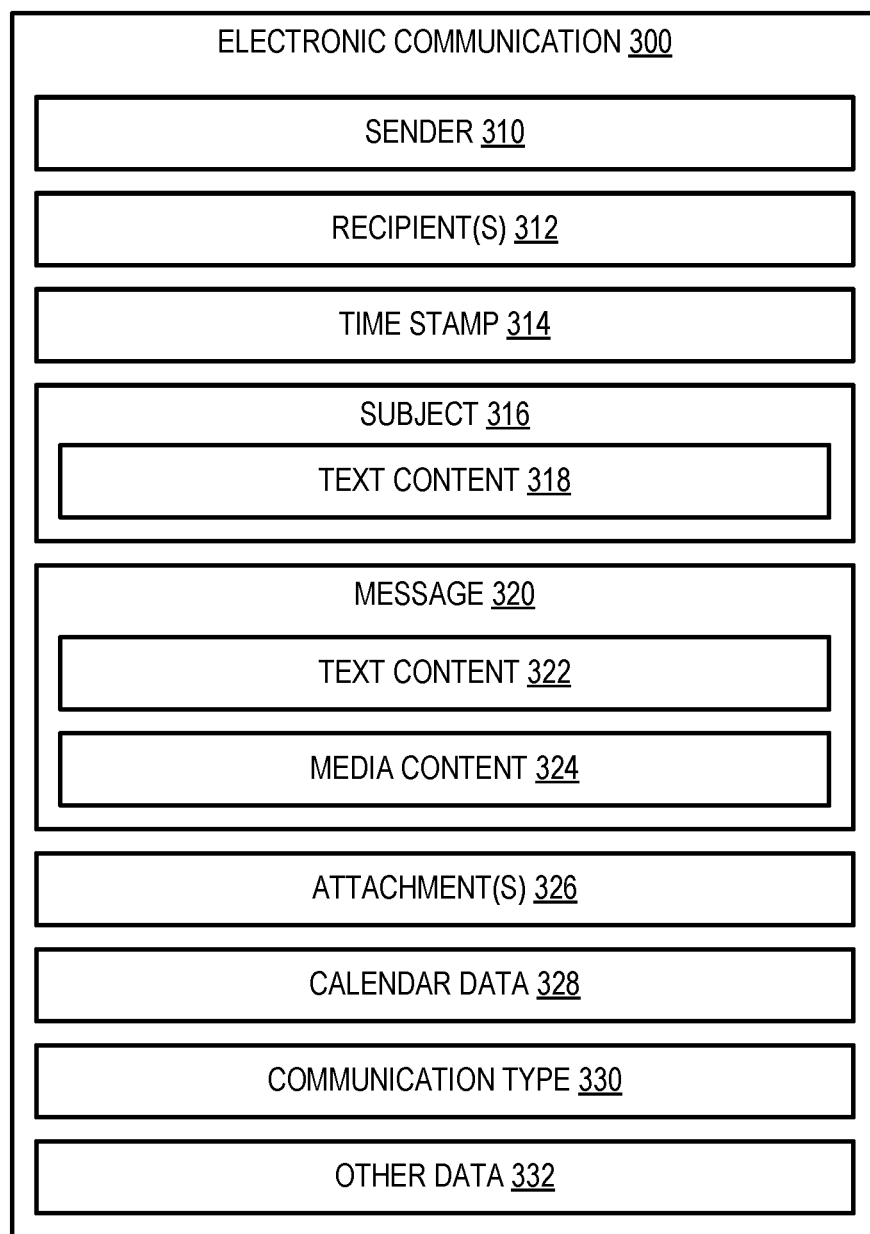
FIG. 3 schematically depicts an example electronic communication.

FIG. 3 schematically depicts an example electronic communication 300. Electronic communications 240 and 266 of FIG. 2 are examples of electronic communication 300. In an example, electronic communication 300 takes the form of data that includes or identifies a sender 310, one or more recipients 312, a timestamp 314 indicating a timing (e.g., a clock time and a date of transmission or reception) of receipt or transmission of the electronic communication, a subject 316 which may include text content 318, a message 320 which may include text content 322 and/or media content 324, one or more attachments 326, calendar data 328, a communication type 330, and/or other data 332. Electronic communication 300 is provided as a nonlimiting example. The present disclosure is compatible with virtually any type of electronic communication, regardless of the contents of the electronic communication that may be specific to that type of electronic communication. As such, various aspects of the electronic communication may optionally be omitted, and/or various aspects that are not illustrated may be included.

In an example, a user acting as a sender of electronic communication 300 may define, through user input, one or more of recipients 312, subject 316 including text content 318, message 320 including text content 322 and/or media content 324, attachments 326, calendar data 328, and/or other data 332 of electronic communication 300. Timestamp 314 may be assigned by the communications application or communications service as a timing of transmission or reception of electronic communication 300. Communication type 330 may be dependent upon the communications application or service used by the sender, or may be defined or otherwise selected by user input of the sender in the case of a communications application or service that supports multiple communication types.

Figure 4:
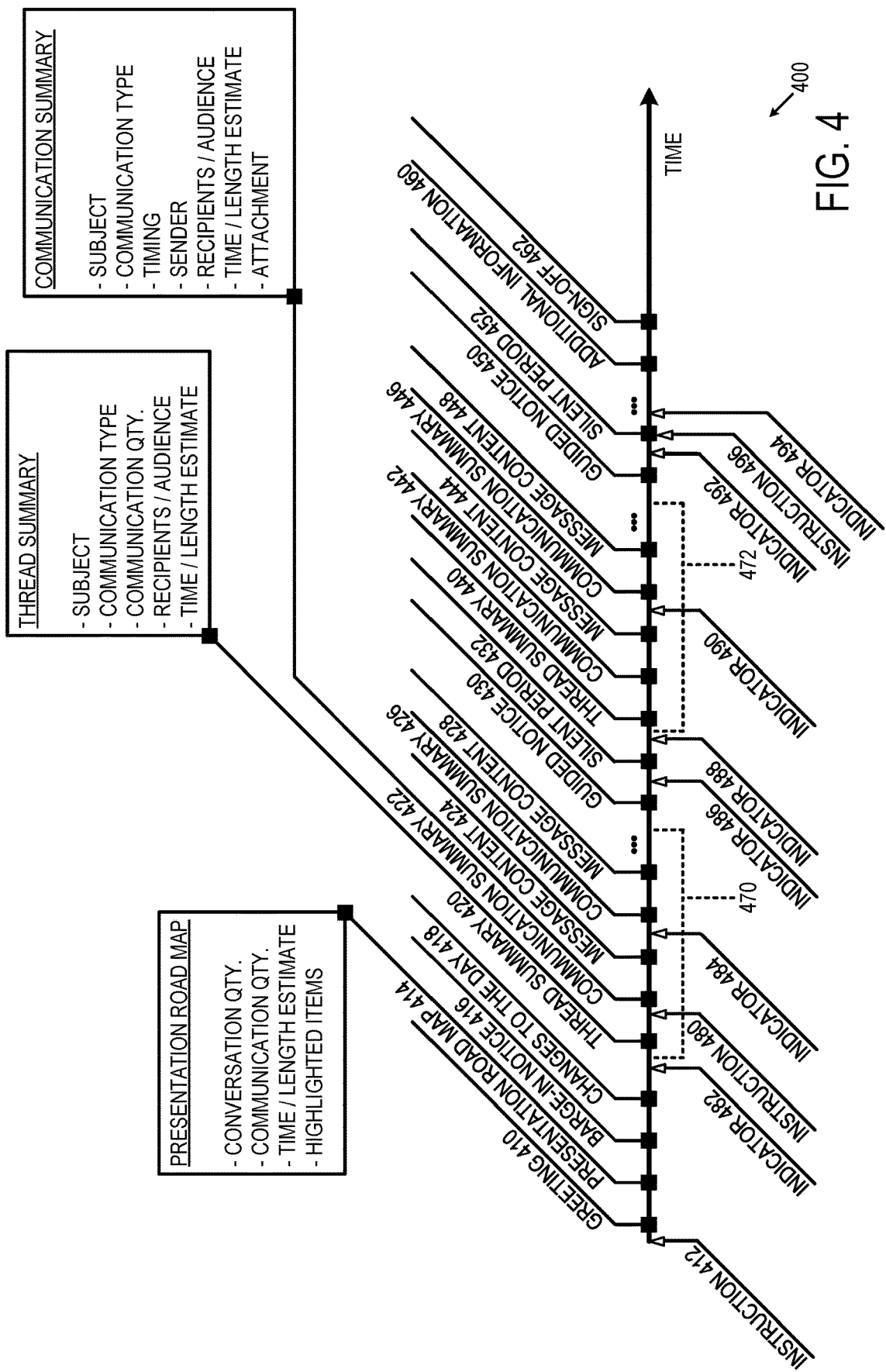
FIG. 4 depicts an example timeline of an audio presentation output by a personal assistant device.

FIG. 4 depicts an example timeline 400 of an audio presentation output by a personal assistant device, such as device 120 of FIG. 1 or computing device 210 of FIG. 2. Within timeline 400, time advances from a left-hand side of the figure to a right-hand side of the figure. Timeline 400 may be instantiated from a predefined template that may be implemented by the personal assistant device disclosed herein. Accordingly, the audible outputs described with respect to timeline 400 may be omitted, repeated, or presented in a different order in other examples. Furthermore, additional audible outputs may be included in place of or between the audible outputs of timeline 400.

At 410, a greeting may be presented as an audible output. In an example, the greeting may be presented in response to an instruction 412 received by the personal assistant device to initiate presentation of unreviewed electronic communications for a recipient. Instruction 412 may take the form of a spoken command by a user or other type of user input received by the personal assistant device. For example, in FIG. 1, user 110 provides an instruction "Read messages" as a spoken command, and personal assistant device 120 responds by presenting the greeting "Hi Sam!".

At 414, a presentation roadmap may be presented as an audible output. The presentation roadmap may identify one or more of: a quantity of conversation threads that include one or more unreviewed electronic communications for the recipient, a quantity of the unreviewed electronic communications, a time estimate of the audio presentation for presenting the conversation threads that include unreviewed electronic communications, a length estimate of the unreviewed electronic communications, one or more highlighted items, and/or other suitable information.

At 416, a barge-in notice may be presented as an audible output. The barge-in notice may be used to notify the user that a spoken command may be provided by the user to perform an action with respect to the audio presentation or its contents. Referring to the example of FIG. 1, the personal assistant device may present the audible output "Feel free to interrupt" as an example of the barge-in notice presented at 416.

At 418, one or more changes to the day of the user may be presented as an audible output. Changes to the day may include updates to the user's calendar, and optionally may be derived from calendar data of one or more of the unreviewed electronic communications.

As described in further detail with reference to FIGS. 5-7, electronic communications for a recipient may be organized into conversation threads in which each conversation thread includes two or more reply-linked electronic communications. By organizing electronic communications into conversation threads, a user listening to an audio presentation of the electronic communications may be better able to comprehend or track a dialog between or among senders and recipients of the electronic communications that form part of the same conversation thread. By contrast, presenting electronic communications according only to their chronological order without regard to the context of the conversation may be more difficult for a user to comprehend or track dialogs between or among senders and recipients, particularly within the context of audio presentation of such communications.

A first conversation thread that includes one or more unreviewed electronic communications for the user may be presented at 470, including a conversation thread summary 420 of the first conversation thread, a communication summary 422 for each unreviewed electronic communication of the first conversation thread, and message content 424 for each unreviewed electronic communication of the first conversation thread.

At 420, the conversation thread summary for the first conversation thread may be presented as an audible output. The conversation thread summary may identify one or more of: a subject of the conversation thread as identified from an electronic communication of the conversation thread, a type of the electronic communications of the conversation thread, a quantity of unreviewed electronic communications of the conversation thread, recipients and/or an audience (e.g., quantity, identities of the recipients, and/or a quantity/identity of recipients that were added or removed in relation to prior reply-linked communications) of the conversation thread as identified from an electronic communication of the conversation thread, a time estimate of a portion of the audio presentation for presenting the unreviewed electronic communications of the conversation thread, a length estimate of the unreviewed electronic communications of the conversation thread, and/or other suitable information.

Example outputs by the personal assistant device with respect to a quantity of unreviewed electronic communications of a conversation thread are described in further detail with reference to FIG. 9C. Example outputs by the personal assistant device with respect to time and/or length of a conversation thread and/or an electronic communication are described in further detail with reference to FIGS. 9A and 9E. In an example, the time and/or length estimate of the conversation thread summary may include a length warning. Referring to the example of FIG. 1, the personal assistant device may present the audible output "long conversation" as an example of a length warning.

At 422, a first communication summary for a first unreviewed electronic communication of the first conversation thread may be presented as an audible output. The communication summary may identify one or more of a subject of the electronic communication, a type of the electronic communication, a timing of the electronic communication based on the timestamp of the electronic communication, a sender of the electronic communication, recipients and/or an audience of the electronic communication, a time estimate of a portion of the audio presentation for presenting the electronic communication, a length estimate of the electronic communication, an indication of whether one or more attachments are included with the electronic communication, and/or other suitable information. Example outputs by the personal assistant device with respect to recipients and/or an audience of a conversation thread are described in further detail with reference to FIG. 9B.

At 424, message content of the first unreviewed electronic communication of the first conversation thread may be presented as an audible output. For example, an audible output of the text content of the message of the first unreviewed electronic communication may be presented in part or in its entirety at 424. In FIG. 1, for example, personal assistant device 120 outputs an audible output of text content of an electronic communications as "GOAL! Can you believe it's already World Cup time?". In at least some examples, the personal assistant device may select one or more portions of the text content to include in the audible output and/or exclude from the audible output. For example, the personal assistant device may refrain from audibly outputting text content of signature blocks at a conclusion of a message or web domain addresses included within the message. Text content may be audibly output as an audible reproduction of its text to provide a literal reading of the text content in some examples. In other examples, text content may be intelligently edited by the personal assistant device to provide an improved listening experience for the user, including correcting spelling/grammatical errors in the text content, reordering text components of the text content, and/or summarizing the text content in the audible output.

Following presentation of the first unreviewed electronic communication, the audio presentation may proceed to a second unreviewed electronic communication of the first conversation thread. For example, at 426, a second communication summary for a second unreviewed electronic communication of the first conversation thread may be presented as an audible output. At 428, message content of the second unreviewed electronic communication of the first conversation thread may be presented as an audible output. The audio presentation may proceed sequentially through each unreviewed electronic communication of the first conversation thread. In at least some examples, the unreviewed electronic communications of a conversation thread may be presented according to a chronological-sequential order based on the respective timestamps of the unreviewed electronic communications, beginning with the oldest unreviewed electronic communication and continuing through to the most recent unreviewed electronic communication of the conversation thread.

At 430, a guided notice may be presented as an audible output. The guided notice may be used to inquire whether the user would like to perform an action with respect to the first conversation thread. As an example, the guided notice may provide a general notice to the user, such as "perform an action or proceed to the next conversation?" or may provide targeted notices, such as "would you like to reply to this conversation?". At 432, a silent period may be provided to enable the user to provide an instruction or otherwise take action with respect to the conversation thread before proceeding to the next conversation thread of the audio presentation.

Following presentation of the first conversation thread at 470, the audio presentation may proceed to presenting a second conversation thread at 472 that includes one or more unreviewed electronic communications for the recipient. Presentation of the second conversation thread may similarly include presentation of a thread summary for the second conversation thread at 440, a communication summary for a first unreviewed electronic communication of the second conversation thread at 442, message content of the first unreviewed electronic communication of the second conversation thread at 444, a communication summary for a second unreviewed electronic communication of the second conversation thread at 446, message content of the second unreviewed electronic communication of the second conversation thread at 448, etc., until each unreviewed electronic communication of the second conversation thread has been presented as an audible output.

The audio presentation may proceed through each conversation thread that includes one or more unreviewed electronic communications for the recipient, as previously described with reference to the presentation of the first conversation thread at 470. Following presentation of the conversation threads that included one or more unreviewed electronic communications, additional information that the personal assistant device determines as being potentially relevant to the user may be presented as an audible output at 460. At 462, the user may be signed-off from the audio presentation session by the personal assistant device.

Continuing with the example timeline of FIG. 4, a user may provide an instruction to the personal assistant device to navigate within the audio presentation or among conversation threads and their electronic communications. For example, responsive to instruction 480, the personal assistant device may advance the audio presentation from presenting communication summary at 422 to presenting thread summary at 440 of the second conversation thread, thereby enabling the user to skip presentation of some or all of the first conversation thread. In FIG. 1, user 110 provided the spoken command "Next conversation", as an example of instruction 480. As another example, responsive to instruction 480, the personal assistant device may advance the audio presentation from presenting communication summary at 422 for the first unreviewed electronic communication to presenting communication summary at 426 for the second unreviewed electronic communication, thereby enabling the user to skip presentation of some or all of the first unreviewed electronic communication.

By organizing electronic communications into conversation threads, a user may perform an action with respect to the electronic communications of that conversation thread. For example, as described above, a user may skip audio presentation of a particular conversation thread, including the unreviewed electronic communications of the conversation thread, by providing a spoken command, such as "Next conversation" of FIG. 1. As another example, a user may delete electronic communications of a conversation thread or mark such electronic communications as important by providing a spoken command, such as instruction 496 within silent period 452. Accordingly, the personal assistant device may apply an action to each of a plurality of electronic communications of a conversation thread responsive to a spoken command by a user.

In at least some examples, audible indicators may be presented as an audible output by the personal assistant device to notify the user of transitions between portions of the audio presentation. For example, audible indicator 482 may be presented between presentation of the changes to the day at 418 and the thread summary at 420, audible indicators 484 and 490 may be presented between electronic communications, audible indicators 486 and 492 may be presented between the guided notice and the silent period, and audible indicators 488 and 494 may be presented between the silent period and a subsequent conversation thread and the additional information presented at 460 or sign-off at 462. An audible indicator may take the form of an audible tone or any suitable sound. Audible indicators having distinguishable sounds may be presented at different portions of the audio presentation. For example, audible indicator 484 identifying a transition between electronic communications may differ from audible indicator 488 identifying a transition between conversation threads. Such audible indicators may help a user easily understand whether the personal assistant device has started or completed a particular portion of the audio presentation, whether the personal assistant device has completed a particular action as instructed by the user, or whether the personal assistant device is currently listening for an instruction to be provided by the user.

The personal assistant device may support various presentation modes, including a continuous presentation mode and a guided presentation mode. In the continuous presentation mode, the personal assistant device may proceed through the audio presentation in the absence of instructions from the user. In the guided presentation mode, the personal assistant device may pause the audio presentation at transition points to await an instruction from the user to proceed. For example, in the guided presentation mode, the personal assistant device may pause the audio presentation and output the inquiry: "Would you like to hear this conversation thread" following presentation of the conversation summary.

Figure 5:
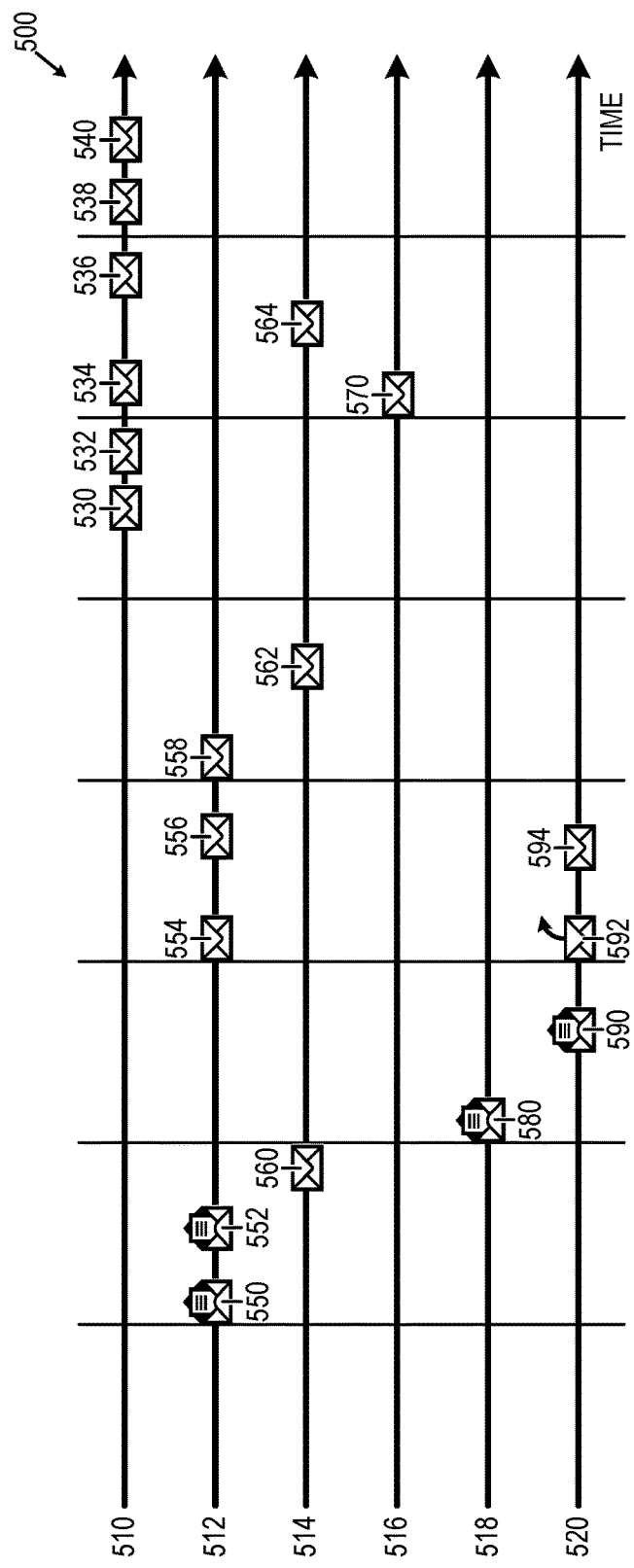
FIG. 5 depicts an example timeline of electronic communications for a recipient.

FIG. 5 depicts an example timeline 500 of electronic communications. Within timeline 500, time advances from a left-hand side of the figure to a right-hand side of the figure. A timing of each electronic communication within FIG. 5 may correspond to a respective timestamp of that electronic communication, such as described with reference to timestamp 314 of FIG. 3.

Timeline 500 is divided into multiple conversation threads 510-520, each including one or more electronic communications of a recipient. In this example, conversation thread 510 includes electronic communications 530-540, conversation thread 512 includes electronic communications 550-558, conversation thread 514 includes electronic communications 560-564, conversation thread 516 includes electronic communication 570, conversation thread 518 includes electronic communication 580, conversation thread 520 includes electronic communications 590-594.

Multiple electronic communications of a conversation thread may be referred to as being reply-linked electronic communications in which one or more electronic communications are replies to an original electronic communication, thereby linking these electronic communications to each other by a common conversation thread. A first electronic communication that is a reply to an earlier second electronic communication which in-turn is a reply to an even earlier third electronic communication may be considered as being reply-linked to both the second and third electronic communications, thereby forming a common conversation thread. For example, electronic communication 534 is a reply to electronic communication 532, which in-turn is a reply to electronic communication 530. Therefore, each of electronic communications 530, 532, and 534 form part of conversation thread 510. For some types of electronic communications, such as collaborative messaging platforms or multi-player gaming platforms, electronic communications associated with a particular channel (e.g., a particular collaborative project or multi-player game) may be identified as being reply-linked to each other.

Furthermore, in this example, electronic communications 530-540, 554-558, 560-564, 570, and 594 are unreviewed electronic communications of the recipient. By contrast, electronic communications 550, 552, 580, and 590 are previously reviewed electronic communications of the recipient. In an example, an electronic communication may be referred to as an unreviewed electronic communication if its message (e.g., message 320 of FIG. 3) of the electronic communication has not been presented to the recipient user through any of visual, audible, or other (e.g., braille) modes of presentation. For example, within the context of email, individual email messages may be marked as "read" or "unread", which may correspond to electronic communications being previously reviewed or unreviewed. Within the example of FIG. 5, electronic communication 592 corresponds to a reply by the recipient to previous electronic communication 590.

As described with reference to the example dialog between user 110 and personal assistant device 120 of FIG. 1, multiple conversation threads may be presented according to a particular presentation order. In at least some examples, a presentation order by which two or more conversation threads are presented may be based on a timing of an unreviewed electronic communication of each conversation thread. In the example of FIG. 5, electronic communications 530-540 of conversation thread 510 are each received after each of electronic communications 550-558 of conversation thread 512, whereas electronic communications 560-564 of conversation thread 514 are interspersed in time with electronic communications of conversation threads 510 and 512.

In a first example presentation order, conversation threads may be presented according to a reverse chronological-sequential order based on a latest unreviewed electronic communication of each conversation thread. In the example timeline of FIG. 5, conversation thread 510 may be presented before conversation threads 512, 514, 516, and 520 because conversation thread 510 includes the latest unreviewed electronic communication 540 having a timing that is after latest unreviewed electronic communications 558, 564, 570, and 594 of conversation threads 512, 514, 516, and 520, respectively. This first example presentation order may be used to prioritize conversation threads that have the most recent activity in terms of unreviewed electronic communications being received for the recipient. Conversation thread 518 may not be presented in this example, because conversation thread 518 does not include any unreviewed electronic communications.

Figure 6:
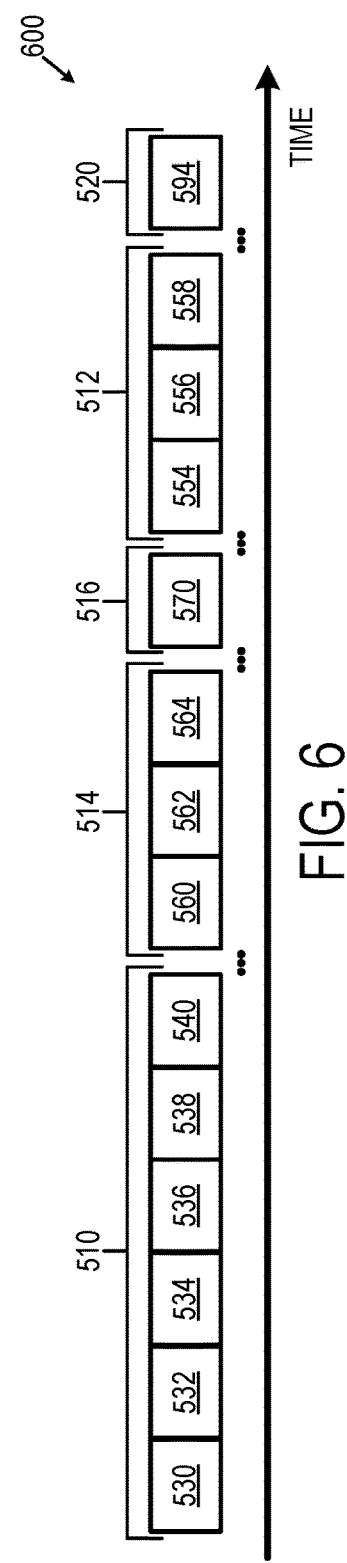
FIG. 6 depicts an example timeline of a presentation order of the electronic communications of FIG. 5.

FIG. 6 depicts an example timeline 600 of the first example presentation order described above with respect to the electronic communications of FIG. 5, in the absence of a user instruction to advance or interrupt presentation of the conversation threads. Within timeline 600, time advances from a left-hand side of the figure to a right-hand side of the figure. Conversation threads 510-516 and 520 are presented within FIG. 6 according to a reverse chronological-sequential order based on a latest unreviewed electronic communication of each conversation thread. Within each conversation thread, unreviewed electronic communications may be presented in chronological-sequential order beginning with an earliest unreviewed electronic communication of the conversation thread and continuing through to the latest unreviewed electronic communication of that conversation thread, again in the absence of a user instruction to advance or interrupt presentation of the conversation threads. For example, according to the first example presentation order depicted in FIG. 6, unreviewed electronic communications of FIG. 5 received according to the following order: 560, 554, 594, 556, 558, 562, 530, 532, 570, 534, 564, 536, 538, 540 are presented in the following order: electronic communications 530-540 of conversation thread 510, electronic communications 560-564 of conversation thread 514, electronic communication 516 of conversation thread 570, electronic communications 554-558 of conversation thread 512, and electronic conversation 594 of conversation thread 520.

Returning to FIG. 5, in a second example presentation order, conversation threads may be presented according to a chronological-sequential order based on a latest unreviewed electronic communication of each conversation thread. This will result in the opposite ordering of conversation threads compared to the reverse-chronological-sequential order described above. For example, in the example timeline of FIG. 5, conversation thread 512 may be presented before conversation threads 510 and 514, because conversation thread 512 includes latest unreviewed electronic communication 558 having a timing that is before latest unreviewed electronic communications 540 and 564 of conversation threads 510 and 514, respectively.

In a third example presentation order, conversation threads may be presented according to a reverse chronological-sequential order based on a timing of an earliest unreviewed electronic communication of each conversation thread. In the example timeline of FIG. 5, conversation thread 510 may be presented before conversation threads 512 and 514, because conversation thread 510 includes earliest unreviewed electronic communication 530 having a timing that is after earliest unreviewed electronic communications 554 and 560 of conversation threads 512 and 514, respectively.

In a fourth example presentation order, conversation threads may be presented according to a chronological-sequential order based on a timing of an earliest unreviewed electronic communication of each conversation thread. In the example timeline of FIG. 5, conversation thread 514 may be presented before conversation threads 510 and 512, because conversation thread 514 includes earliest unreviewed electronic communication 560 having a timing that is before earliest unreviewed electronic communications 530 and 554 of conversation threads 510 and 512, respectively.

In a fifth example presentation order, conversation threads that include a reply by the recipient at some point within the thread may be prioritized in the presentation order over conversation threads that do not include a reply by the recipient. In the example timeline of FIG. 5, unreviewed electronic communication 594 of conversation thread 520 may be presented before electronic communications of conversation threads 510-516, because conversation thread 520 includes reply electronic communication 592 by the recipient. The presence of reply electronic communication 592 in conversation thread 520 may indicate heightened importance of conversation thread 520 as compared to other conversation threads. Among multiple conversation threads that each include a reply by the recipient, the presentation order of unreviewed electronic communications may utilize any of the first, second, third, or fourth example presentation orders discussed above for presenting conversation threads that include a reply by the recipient prior to presenting unreviewed electronic communications of conversation threads that do not include a reply by the recipient.

In a sixth example presentation order, prioritization of conversation threads having a reply by the recipient, such as described above with respect to the fifth example presentation order, may consider only those replies by the recipient for which an unreviewed electronic communication is a reply directly to that reply of the recipient. This presentation order may be used to prioritize conversation threads that include unreviewed electronic communications that are directly reply-linked to replies of the recipient over other conversation threads.

In a seventh example presentation order, conversation threads may be prioritized based on one or more factors, including the content of the subject, message, or attachment of the electronic communications, the senders of the electronic communications, the quantity of electronic communications per conversation thread, the frequency of electronic communications per conversation thread, the presence of importance indicators (e.g., flags) associated with the electronic communications, etc. In an example, conversation threads may be ranked according to the one or more factors, and may be presented in an order that is based on the ranking of the conversation threads. Such ranking may be based on any desired heuristics, machine learning algorithms, or other ranking methodologies.

Figure 7A:
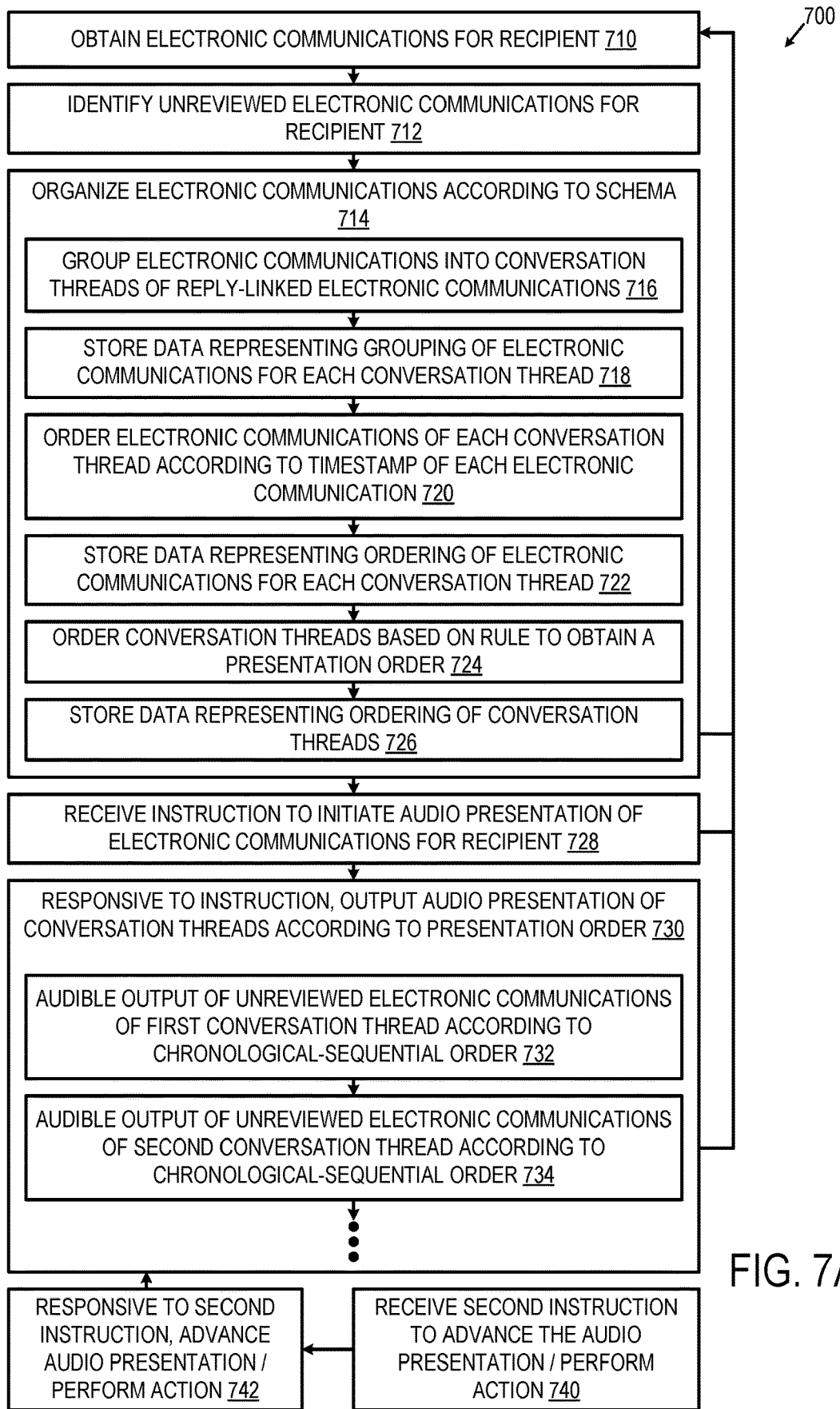
FIG. 7A depicts a flow diagram of an example method for organizing and presenting conversation threads.

FIG. 7A depicts a flow diagram of an example method 700 for organizing and presenting conversation threads. Method 700 or portions thereof may be performed by one or more computing devices of a computing system. For example, method 700 may be performed by computing device 210 of FIG. 2, or by a computing system that includes computing device 210 in combination with server system 260 of FIG. 2.

At 710, electronic communications are obtained for a recipient. In an example, the electronic communications may be obtained at a computing device of a user from a remote server system via a communications network. The electronic communications obtained for the recipient at 710 may span one or more types of electronic communications, and may be collected from one or more communications services and/or applications. Furthermore, the electronic communications obtained at 710 may refer to a subset of all electronic communications of the recipient. For example, the electronic communications obtained at 710 may include a primary or focused inbox or folder of the recipient, and may exclude other inboxes or folders such as junk mail, promotions, etc.

At 712, unreviewed electronic communications are identified for the recipient among the electronic communication obtained at 710. As previously described with reference to FIG. 5, an electronic communication may be referred to as an unreviewed electronic communication if its message (e.g., message 320 of FIG. 3) of the electronic communication has not been presented to the recipient user through any of visual, audible, or tactile (e.g., braille) modes of presentation. In an example, an identifier indicating whether an electronic communication is reviewed or unreviewed may be stored as metadata of the electronic communication. In another example, the identifier may be stored at the communications application or service from which the electronic communication is obtained, and may be reported by the application or service with the electronic communication.

At 714, electronic communications obtained at 710 are organized according to a schema. The schema may be programmatically defined by one or more of a communications application of the user's computing device, by a communications service of a server system, or by a personal assistant machine, depending on implementation. For example, some communications services or applications may organize or partially organize electronic communications into conversation threads, whereas other communications services or applications may not support the use of conversation threads.

At 716, electronic communications obtained at 710 may be grouped into a plurality of conversation threads containing two or more reply-linked electronic communications. As previously described, two or more electronic communications are reply-linked if an electronic communication is a reply to an earlier electronic communication, and that an electronic communication may be reply-linked to an earlier electronic communication by one or more intermediate reply-linked electronic communications. Following operation 716, each conversation thread includes two or more electronic communications for the recipient that are reply-linked to each other. However, it will be understood that at least some conversation threads may include an individual electronic communication. At 718, data representing the grouping of electronic communications may be stored for each conversation thread. For example, data representing the grouping from operation 716 may be stored in a storage subsystem of a computing device, including locally at the user's computing device and/or at a remote server system.

At 720, electronic communications of each conversation thread may be ordered in chronological order according to a timestamp indicating a timing of each electronic communication. At 722, data representing the ordering of electronic communications may be stored for each conversation thread. For example, data representing the ordering from operation 722 may be stored in a storage subsystem of a computing device, including locally at the user's computing device and/or at a remote server system.

At 724, the conversation threads may be ordered based on a rule to obtain a presentation order among the conversation threads. As previously described with reference to the presentation order examples of FIG. 5, a variety of different presentation orders may be supported among conversation threads. According to the first example presentation order described in further detail with reference to FIG. 6, the rule applied at operation 724 may include identifying the most recent unreviewed electronic communication of each conversation thread, and ordering the conversation threads in reverse chronological order based on the timing of the most recent unreviewed electronic communications of the conversation threads. The rule applied at operation 724 may be defined to provide any of the example presentation orders described herein. At 726, data representing the ordering of conversation threads may be stored. For example, data representing the ordering from operation 724 may be stored in a storage subsystem of a computing device, including locally at the user's computing device and/or at a remote server system.

At 728, an instruction to initiate audio presentation of the electronic communications for the recipient is received. The instruction may take the form of a spoken command by a user, such as previously described with reference to FIG. 1 in which user speech 130 includes "Read messages". In at least some examples, a spoken command to initiate the audio presentation may include one or more keywords that are predefined at and recognizable by the personal assistant device, such as "Messages", "Play messages", "Read messages", "Hear messages", "Get mail", "tell me about my emails", What emails do I have?", "Did anyone email me?", "Do I have any new emails?", etc. In at least some examples, a user's intent to initiate the audio presentation by a particular spoken utterance may be inferred from context and/or may be learned from prior interaction with a user. For example, the personal assistant device may ask the user whether the user would like to initiate audio presentation of unreviewed electronic communications, to which the use may respond by speaking "yes" or "please". The instruction received at 728 may also include non-verbal commands, such as user inputs provided via any input device or interface of the user's computing device. Furthermore, in some examples, audio presentation of unreviewed electronic communications may be initiated in certain contexts by the personal assistant device without receiving an instruction. For example, the personal assistant device may initiate the audio presentation responsive to a particular operating condition, such as a scheduled time, a user picking up the personal assistant device, reception of a new unreviewed electronic communication, etc.

At 730, responsive to the instruction received at 728, an audio presentation of the conversation threads is output according to the presentation order obtained at operation 724. The presentation order may be defined by one or more of the grouping of electronic communications at 716, the ordering of electronic communications at 720, and the ordering of conversation threads at 724, and may be based on the data stored at 718, 722, and 726.

In an example, the audio presentation includes unreviewed electronic communications of each conversation thread in a chronological-sequential order beginning with an oldest unreviewed electronic communication and continuing to a most recent unreviewed electronic communication of the conversation thread before another of the plurality of conversation threads that includes an unreviewed electronic communication that is interspersed in time between the oldest unreviewed electronic communication and the most recent unreviewed electronic communication of the conversation thread. For example, at 732, two or more unreviewed electronic communications of a first conversation thread are audibly output according a chronological sequential order before unreviewed electronic communications of a second conversation thread at 734.

Furthermore, in an example, the presentation order of the conversation threads may be a reverse chronological-sequential order based on a most recent unreviewed electronic communication of each of the plurality of conversation threads such that the first conversation thread having a first most recent unreviewed electronic communication is presented at 732 before the second conversation thread having a second most recent unreviewed electronic communication that is older than the first most recent unreviewed electronic communication of the plurality of conversation threads. An example of this reverse chronological-sequential order is described with reference to FIG. 6.

The audio presentation output at 730 may include, for each unreviewed electronic communication, at least a portion of text content of a message of the unreviewed electronic communication presented as an audible output. In an example, all text content of the message of the unreviewed electronic communication may be presented as an audible output. Furthermore, in at least some examples, the audio presentation further includes, for each conversation thread of the plurality of conversation threads, a thread summary of the conversation thread presented as an audible output before the text content of the conversation thread. Examples of thread summaries presented before message content are described with reference to FIG. 4.

At 740, a second instruction to advance the audio presentation may be received. The instruction received at 740 may take the form of a spoken command of a user, such as previously described with reference to FIG. 1 in which user speech 130 includes "Next conversation". However, the instruction received at 740 may include non-verbal commands, such as user inputs provided via any input device or interface of the user's computing device.

At 742, responsive to the second instruction, the audio presentation of the plurality of conversation threads may be advanced from a current conversation thread to a subsequent conversation thread of the presentation order. It will be understood that other forms of navigation within the audio presentation may be supported by the personal assistant device, including ending the audio presentation, restarting the audio presentation, skipping to a next conversation thread, skipping to a particular conversation thread identified by the user, skipping a next unreviewed electronic communication, skipping to a particular unreviewed electronic communication identified by the user, etc.

The action of advancing audio presentation with respect to a conversation thread is one of a plurality of actions that may be supported by the personal assistant device. For example, operation 740 may instead include an instruction to perform a different action, such as replying to, forwarding on to another recipient, storing, or deleting the conversation thread, or marking the conversation thread as important (e.g., flagging the conversation thread or an electronic communication thereof). For at least some types of action, responsive to the instruction to perform the action, the action may be applied to each electronic communication of the conversation thread by the personal assistant device at 742. A spoken command used to initiate a particular action by the personal assistant device may include one or more keywords that are predefined at and recognizable by the personal assistant device, or an intent of a spoken utterance may be inferred by the personal assistant device from context, such as previously described with reference to the instruction received at 728.

Figure 7B:
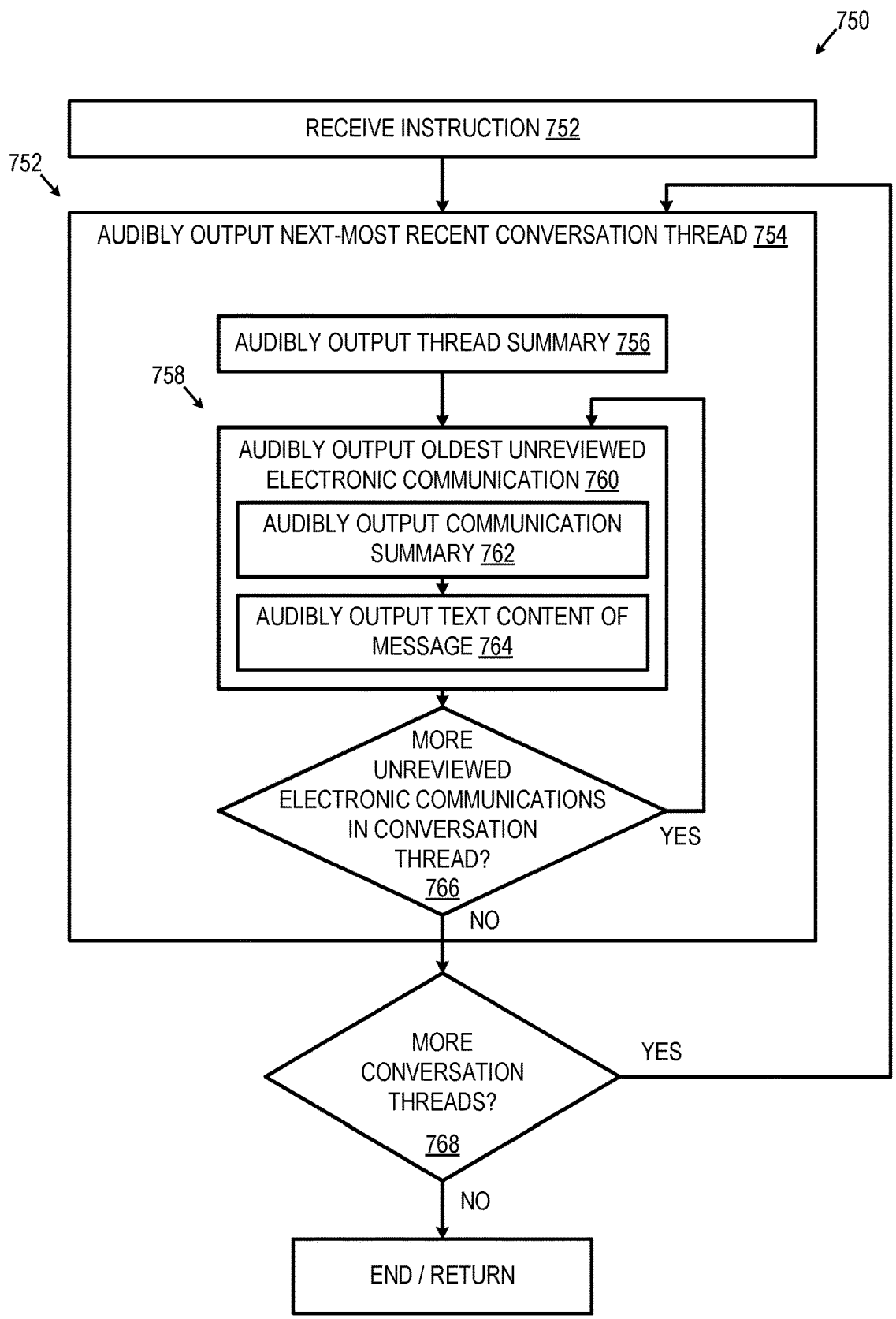
FIG. 7B depicts a flow diagram of an example method for presenting conversation threads.

FIG. 7B depicts a flow diagram of an example method 750 for presenting conversation threads. Method 750 may be performed in combination with method 700 of FIG. 7A. For example, method 750 or portions thereof may form part of operation 730 of method 700. Method 750 or portions thereof may be performed by one or more computing devices of a computing system. For example, method 700 may be performed by computing device 210 of FIG. 2, or by a computing system that includes computing device 210 in combination with server system 260 of FIG. 2.

At 752, an instruction may be received. For example, the instruction received at 752 may correspond to the instruction received at 728 of FIG. 7A. Responsive to the instruction, the method at 752 includes audibly outputting each unreviewed electronic communication in a most-recent conversation thread including a most-recent set of unreviewed, reply-linked electronic communications for the recipient. For example, the personal assistant device audibly outputs the next-most recent conversation thread at 754. As part of audibly outputting the next-most recent conversation thread at 754, the personal assistant device may audibly output the thread summary at 756. However, the thread summary may not be audibly output in other examples.

At 758, each unreviewed electronic communication in the most-recent conversation thread may be audibly output in a chronological-sequential order beginning with an oldest unreviewed electronic communication at 760. Audibly outputting the oldest unreviewed electronic communication at 760 may include audibly outputting the communication summary at 762 and audibly outputting some or all of the text content of the message at 764. However, the communication summary may not be audibly output in other examples.

At 766, if more unreviewed electronic communications are in the conversation thread, the method returns to 760 where the oldest unreviewed electronic communication is audibly output. Accordingly, the method continues to a most-recent unreviewed electronic communication, such as previously described with reference to the example presentation order of FIG. 6.

At 766, if there are no more unreviewed electronic communications in the conversation thread, the method proceeds to 768. At 768, if there are more conversation threads that include unreviewed electronic communications, the method may return to 754 where the next-most recent conversation thread is audibly output at 754. Accordingly, responsive to completing audible output of the most-recent unreviewed electronic communication from a conversation thread, the method includes audibly outputting each unreviewed electronic communication in a next-most-recent conversation thread including a next-most-recent set of unreviewed, reply-linked electronic communications for the recipient. Each unreviewed electronic communication in the next-most-recent conversation thread is audibly output at 758 in a chronological-sequential order beginning with an oldest unreviewed electronic communication and continuing to a most-recent unreviewed electronic communication.

As described, for example, with reference to FIGS. 4-6, at least one unreviewed electronic communication from the next-most-recent communication thread may be chronologically intermediate two unreviewed electronic communications from the most-recent conversation thread, and all of the unreviewed electronic communications from the most-recent conversation thread may be audibly output before any of the unreviewed electronic communications from the next-most-recent communication thread are audibly output through the use of method 750.

Figure 8:
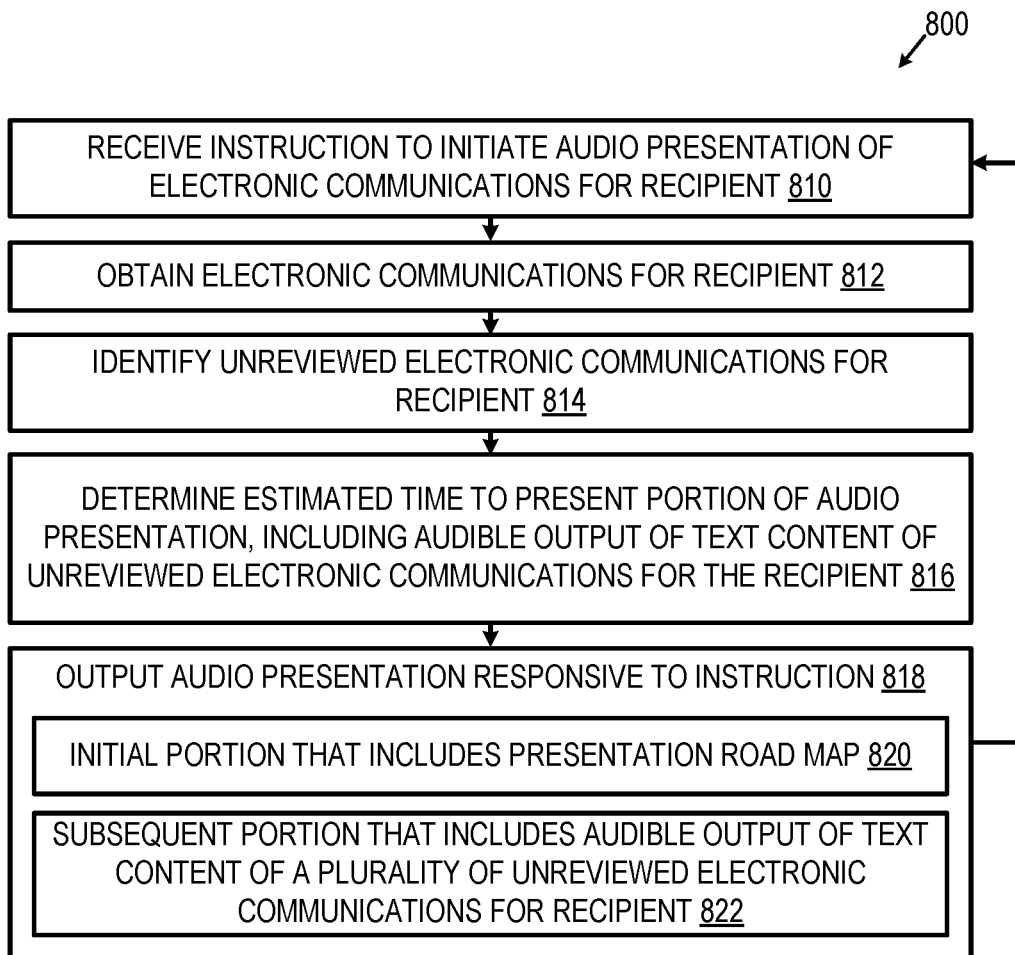
FIG. 8 depicts a flow diagram of an example method for presenting time identifying information for a conversation thread.

FIG. 8 depicts a flow diagram of an example method 800 for presenting time identifying information for a conversation thread. Method 800 or portions thereof may be performed by one or more computing devices of a computing system. For example, method 800 may be performed by computing device 210 of FIG. 2, or by a computing system that includes computing device 210 in combination with server system 260 of FIG. 2.

At 810, the method includes receiving an instruction to initiate audio presentation of electronic communications for a recipient. As previously described with reference to operation 728 of FIG. 7, the instruction may include a spoken command of a user.

At 812, electronic communications for the recipient are obtained. As previously described with reference to operation 710 of FIG. 7, electronic communications for the recipient may be obtained at a computing device of a user from a remote server system via a communications network.

At 814, unreviewed electronic communications for the recipient are identified. As previously described with reference to FIG. 5, an electronic communication may be referred to as an unreviewed electronic communication if its message (e.g., message 320 of FIG. 3) has not been presented to the recipient user through any of visual, audible, or other (e.g., braille) modes of presentation. In an example, an identifier indicating whether an electronic communication is reviewed or unreviewed may be stored as metadata of the electronic communication. In another example, the identifier may be stored at the communications application or service from which the electronic communication is obtained, and may be reported by the application or service with the electronic communication.

At 816, an estimated time is determined to present a portion of an audio presentation in which the portion includes audible output of text content of the unreviewed electronic communications for the recipient. The text content may include the text content of a message of each unreviewed electronic communication. As an example, the estimated time is determined based on a feature of the text content of the plurality of unreviewed electronic communications. The feature of the text content may include a word count or a character count of the text content, as examples; and the time estimate may be algorithmically computed based on the word or character count (e.g., 0.7 seconds per word). As another example, the method may further include converting the text content of the plurality of unreviewed electronic communications into audio data representing the audible output of the text content, determining the estimated time to present the subsequent portion of the audio presentation based on a feature of the audio data. The feature of the audio data may include an amount (e.g., a byte count) of the audio data or a duration of the audio data at a target presentation rate, as examples.

The estimate time may be determined based on other information contained in the audio presentation that is to be audibly output by the personal assistant device in the subsequent portion. For example, where the audio presentation includes thread summaries for each conversation thread, the estimated time may be determined further based on the duration of the thread summaries within the subsequent portion of the audio presentation.

In at least some examples, the estimated time identified by the presentation road map may take the form of a generalized time estimate. FIG. 9A depicts examples of generalized time estimates. In the case of a generalized time estimate, operation 816 may further include determining an initial value for the estimated time, and selecting the generalized time estimate from a plurality of graduated generalized time estimates based on the initial value for the estimated time. The examples of a generalized time estimate depicted in FIG. 9A refer to sessions durations that represent the initial value for the estimated time. In at least some examples, the estimated time may be rounded to a generalized time estimate, for example, as depicted in FIG. 9A.

At 818, the audio presentation is output responsive to the instruction. Outputting the audio presentation includes outputting an initial portion of the audio presentation that includes a presentation road map 820, and a subsequent portion that includes the audible output of the text content of the plurality of unreviewed electronic communications for the recipient. In an example, the presentation road map output at 820 identifies the estimated time to present the subsequent portion of the audio presentation output at operation 822, which corresponds to the portion for which the estimate time was determined at operation 816.

The presentation road map output at 818 may identify other features of the audio presentation, such as previously described with reference to FIG. 4. As an example, the presentation road map may further identify a quantity of the unreviewed electronic communications and/or a quantity of conversation threads for the unreviewed electronic communications.

Aspects of method 800 may be similarly performed to present an estimated time in a thread summary for a conversation thread containing one or more reply-linked electronic communications or for a communication summary of an individual electronic communication, such as described with reference to FIG. 4.

FIGS. 9A-9E depict tables in which example audible outputs by a personal assistant device are provided for a range of conditions. The audible outputs depicted in FIGS. 9A-9E may be used as part of a dialog with a user, including as part of the presentation roadmap, thread summary, and communication summary as examples.

FIG. 9A depicts various example natural language responses by the personal assistant device based on an estimate time or duration of an audio presentation or a portion thereof.

FIG. 9B depicts various example natural language responses by the personal assistant device based on the recipients of an electronic communication or conversation thread.

FIG. 9C depicts various example natural language responses by the personal assistant device based on a quantity of unreviewed electronic communications of a conversation thread.

FIG. 9D depicts various example natural language responses by the personal assistant device based on changes to the recipients of electronic communications within a conversation thread.

FIG. 9E depicts various example natural language responses by the personal assistant device based on an estimate of a duration of an audio presentation of text content of a message.

FIGS. 10A-10P depict example dialogs between a user and a personal assistant device in accordance with the above description. The portions of the example dialogs of FIGS. 10A-10P corresponding to the personal assistant device denoted by "Assistant" may take the form of audible outputs of the personal assistant device, and the portions of the dialogs corresponding to the user denoted by "User" may take the form of spoken utterances of the user.

In at least some examples, the personal assistant device may utilize one or more conversation templates configured to implement the logic of method 700. For example, the timeline of FIG. 4 may represent a dialog instantiated from a conversation template that begins with a greeting 410, progresses to a presentation roadmap 414, changes to the day 418, and then loops through each unreviewed conversation thread according to method 750, before ending with a guided notice 450, additional information 460, and sign off 462. It is to be understood that different templates presenting information in different orders may be used. Such templates may be configured to branch to different dialog orders responsive to user instructions.

FIGS. 10A-10C depict an example dialog. In FIG. 10A, the personal assistant device audibly outputs a presentation roadmap such as previously described with reference to FIG. 1, followed by audible output of additional conversation threads. In FIGS. 10B and 10C, the user provides instructions to perform additional actions with respect to conversation threads, including flagging electronic communications as important. In FIG. 10B, for example, the user uses a barge-in spoken command in the form of "flag that" as the personal assistant device is audibly outputting text content of a message from sender "Satya". Also, in FIG. 10B, the user provides a spoken command "Flag it" during a silent period (e.g., silent period 432 of FIG. 4) provided by the personal assistant device after a conversation thread for the subject "Pizza party" is audibly output by the personal assistant device. In FIG. 10C, the personal assistant device concludes the audio presentation of electronic communications by audibly outputting "You've got a package from Company XYZ on its way" as an example of additional information 460 of FIG. 4, and "That's all for now" as an audible indication of sign-off 462 of FIG. 4.

FIGS. 10D and 10E depict example dialogs for inbox inquiries. In FIG. 10D, the personal assistant device uses a guided presentation mode in which the personal assistant device asks the user "Which sender do you wanna hear more about?" after a presentation roadmap is audibly output that identifies specific senders "Jade", "Ruby", and "Trent" among other road map information. This inquiry by the personal assistant device may take the form of barge-in notice 416 of FIG. 4. Responsive to the user speaking "Jade", the personal assistant device presents a thread summary for the unreviewed electronic communication from Jade, which again identifies the sender "Jade", the subject "Touching letter . . . ", and a time/length estimate of "it's a long one". Following the thread summary, the personal assistant device uses the guided presentation mode to ask the user "Wanna hear it?", and responsive to the user providing the spoken command "yes" the personal assistant device audibly outputs at least a portion of the text content of the message.

In FIG. 10E, the personal assistant device highlights three unreviewed electronic communications that the user may want to hear from a total of 10 unreviewed electronic communications.

FIG. 10F depicts an example dialog for people-based queries.

FIG. 10G depicts an example dialog in which the personal assistant device highlights a particular sender of an electronic communication within a presentation roadmap.

FIG. 10H depicts an example dialog of an inbox inquiry in which the personal assistant device determines that unreviewed electronic communications are not important.

FIG. 10I depicts an example dialog of an inbox inquiry in which there are no unreviewed electronic communications for the recipient.

FIG. 10J depicts an example dialog in which the personal assistant device prepares and sends an electronic communication on-behalf of the user responsive to spoken commands.

FIG. 10K depicts an example dialog in which the personal assistant device replies to an electronic communication on-behalf of the user responsive to spoken commands.

FIG. 10L depicts an example dialog in which the personal assistant device replies to an electronic communication having a plurality of recipients on-behalf of the user responsive to spoken commands.

FIG. 10M depicts an example dialog in which the personal assistant device forwards an electronic communication to another recipient identified by the user through a spoken command.

FIG. 10N depicts an example dialog in which the personal assistant device saves a draft of a reply on-behalf of the user.

FIG. 10O depicts an example dialog in which the user selects a particular electronic communication to be audibly output by the personal assistant device.

FIG. 10P depicts an example dialog in which the personal assistant device audibly outputs calendar data of electronic communications and performs actions with respect to the calendar data responsive to spoken commands of the user. For example, the personal assistant device outputs "Would you like to accept this meeting?" for which the user responds "Yes", responsive to which the personal assistant device sends a meeting confirmation reply to the sender of the meeting request (i.e., "Nicki").

In at least some examples, the methods and processes described herein may be tied to a computing system of one or more computing devices. In particular, such methods and processes may be implemented as a computer-application program or service, an application-programming interface (API), a library, and/or other computer-program product.

Referring again to FIG. 2, computing system 200 is an example computing system that can enact one or more of the methods and operations described herein. Computing system 200 is shown in simplified form. Computing system 200 may take the form of one or more mobile computing devices, wearable computing devices, computing devices integrated with vehicles, desktop computing devices, household appliance computing devices, personal computers, server computers, tablet computers, home-entertainment computers, network computing devices, gaming devices, mobile computing devices, mobile communication devices (e.g., smart phone), Internet of Things (IoT) devices, embedded computing devices, and/or other computing devices.

Logic subsystem 212 may include one or more processors configured to execute software instructions. Additionally or alternatively, the logic subsystem may include one or more hardware or firmware logic circuits configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 214 may include removable and/or built-in devices. Storage subsystem 214 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 214 may include volatile, nonvolatile, dynamic, static, read/write, read-only, random-access, sequential-access, location-addressable, file-addressable, and/or content-addressable devices. It will be appreciated that storage subsystem 214 includes one or more physical devices and is not merely an electromagnetic signal, an optical signal, etc. that is not held by a physical device for a finite duration.

Aspects of logic subsystem 212 and storage subsystem 214 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When the methods and operations described herein are implemented by logic subsystem 212 and storage subsystem 214, a state of storage subsystem 214 may be transformed—e.g., to hold different data. For example, logic subsystem 212 may be configured to execute instructions 222 that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem and the storage subsystem may cooperate to instantiate one or more logic machines, such as previously described with reference to personal assistant machine 230, speech output machine 232, and speech input machine 234. It will be understood that the "machines" as described herein (e.g., with reference to FIG. 2) are never abstract ideas and always have a tangible form. Instructions 222 that provide a particular machine with functionality in combination with hardware may optionally be saved as an unexecuted module on a suitable storage device, and such a module may be transmitted via network communication and/or transfer of the physical storage device on which the module is saved.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

In at least some examples, I/O subsystem 216 may include or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

It will be appreciated that a "service", as used herein, is an application program executable across multiple user sessions. A service may be available to one or more system components, programs, and/or other services. In some implementations, a service may run on one or more server-computing devices.

According to an example of the present disclosure, a method performed by a computing system comprises: receiving an instruction to initiate audio presentation of electronic communications for a recipient; responsive to the instruction, audibly outputting each unreviewed electronic communication in a most-recent conversation thread including a most-recent set of unreviewed, reply-linked electronic communications for the recipient, wherein each unreviewed electronic communication in the most-recent conversation thread is audibly output in a chronological-sequential order beginning with an oldest unreviewed electronic communication and continuing to a most-recent unreviewed electronic communication; and responsive to completing audible output of the most-recent unreviewed electronic communication from a conversation thread, audibly outputting each unreviewed electronic communication in a next-most-recent conversation thread including a next-most-recent set of unreviewed, reply-linked electronic communications for the recipient, wherein each unreviewed electronic communication in the next-most-recent conversation thread is audibly output in a chronological-sequential order beginning with an oldest unreviewed electronic communication and continuing to a most-recent unreviewed electronic communication. In this or any other example disclosed herein, at least one unreviewed electronic communication from the next-most-recent communication thread is chronologically intermediate two unreviewed electronic communications from the most-recent conversation thread, and all of the unreviewed electronic communications from the most-recent conversation thread are audibly output before any of the unreviewed electronic communications from the next-most-recent communication thread are audibly output.

According to another example of the present disclosure, a method performed by a computing system comprises: receiving an instruction to initiate audio presentation of electronic communications for a recipient; and responsive to the instruction, outputting an audio presentation of a plurality of conversation threads according to a presentation order, wherein each conversation thread includes two or more unreviewed electronic communications for the recipient that are reply-linked to each other, the audio presentation including the two or more unreviewed electronic communications of each conversation thread in a chronological-sequential order beginning with an oldest unreviewed electronic communication and continuing to a most recent unreviewed electronic communication of the conversation thread before another of the plurality of conversation threads that includes an unreviewed electronic communication that is interspersed in time between the oldest unreviewed electronic communication and the most recent unreviewed electronic communication of the conversation thread. In this or any other example disclosed herein, the presentation order is a reverse chronological-sequential order based on a most recent unreviewed electronic communication of each of the plurality of conversation threads such that: a first conversation thread having a first most recent unreviewed electronic communication is presented before a second conversation thread having a second most recent unreviewed electronic communication that is older than the first most recent unreviewed electronic communication of the plurality of conversation threads. In this or any other example disclosed herein, the method further comprises: receiving a second instruction to advance the audio presentation of the plurality of conversation threads; and responsive to the second instruction, advancing the audio presentation of the plurality of conversation threads from a current conversation thread to a subsequent conversation thread of the presentation order. In this or any other example disclosed herein, the method further comprises receiving a second instruction to perform an action with respect to a conversation thread of the plurality of conversation threads; and responsive to the second instruction, applying the action to each electronic conversation of the conversation thread. In this or any other example disclosed herein, the audio presentation includes, for each unreviewed electronic communication, at least a portion of text content of a message of the unreviewed electronic communication presented as an audible output. In this or any other example disclosed herein, the audio presentation further includes: for each conversation thread of the plurality of conversation threads, a thread summary of the conversation thread presented as an audible output before the text content of the conversation thread. In this or any other example disclosed herein, the thread summary identifies a quantity of unreviewed electronic communications of the conversation thread. In this or any other example disclosed herein, the thread summary identifies an estimated time to present the conversation thread. In this or any other example disclosed herein, the thread summary identifies a quantity of recipients of the unreviewed electronic communications of the conversation thread. In this or any other example disclosed herein, the thread summary identifies a subject of the conversation thread.

According to another example of the present disclosure, a computing system comprises: an audio output interface to output audio via one or more audio speakers; a logic subsystem; and a storage subsystem having instructions stored thereon executable by the logic subsystem to: receive an instruction to initiate audio presentation of electronic communications for a recipient; and responsive to the instruction, output, via the audio interface, an audio presentation of a plurality of conversation threads according to a presentation order, wherein each conversation thread includes two or more unreviewed electronic communications for the recipient that are reply-linked to each other, the audio presentation including the two or more unreviewed electronic communications of each conversation thread in a chronological-sequential order beginning with an oldest unreviewed electronic communication and continuing to a most recent unreviewed electronic communication of the conversation thread before another of the plurality of conversation threads that includes an unreviewed electronic communication that is interspersed in time between the oldest unreviewed electronic communication and the most recent unreviewed electronic communication of the conversation thread. In this or any other example disclosed herein, the presentation order is a reverse chronological-sequential order based on a most recent unreviewed electronic communication of each of the plurality of conversation threads such that: a first conversation thread having a first most recent unreviewed electronic communication is presented before a second conversation thread having a second most recent unreviewed electronic communication that is older than the first most recent unreviewed electronic communication of the plurality of conversation threads. In this or any other example disclosed herein, the instructions are further executable by the logic subsystem to: receive a second instruction to advance the audio presentation of the plurality of conversation threads; and responsive to the second instruction, advance the audio presentation of the plurality of conversation threads from a current conversation thread to a subsequent conversation thread of the presentation order. In this or any other example disclosed herein, the instructions are further executable by the logic subsystem to: receive a second instruction to perform an action with respect to a conversation thread of the plurality of conversation threads; and responsive to the second instruction, apply the action to each electronic conversation of the conversation thread. In this or any other example disclosed herein, the audio presentation further includes: for each conversation thread of the plurality of conversation threads, a thread summary of the conversation thread presented as an audible output before the text content of the conversation thread. In this or any other example disclosed herein, the thread summary identifies a quantity of unreviewed electronic communications of the conversation thread. In this or any other example disclosed herein, the thread summary identifies an estimated time to present the conversation thread. In this or any other example disclosed herein, the thread summary identifies a subject of the conversation thread.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system of one or more computing devices, comprising:
   a logic subsystem; and
   a storage subsystem having instructions stored thereon executable by the logic subsystem to:
      receive an instruction to initiate an audio presentation of electronic communications for a recipient;
      responsive to the instruction, audibly output unreviewed electronic communications for the recipient according to a presentation order in which the unreviewed electronic communications are grouped into a plurality of conversation threads;
      wherein the presentation order progresses thread-by-thread through the plurality of conversation threads by:
         for each of the plurality of conversation threads, audibly outputting at least a portion of text content of a message of each unreviewed electronic communication of that conversation thread before progressing to another of the plurality of conversation threads,
         for any of the plurality of conversation threads that includes a plurality of unreviewed electronic communications for the recipient, progressing in a chronological-sequential order from an oldest to a most-recent unreviewed electronic communication of that conversation thread, and
         for each of the plurality of conversation threads:
            convert at least the portion of the text content of the message of each unreviewed electronic communication of that conversation thread to audio content,
            determine an estimated duration of time for the computing system to audibly output the unreviewed electronic communications of that conversation thread based on the audio content, and
            audibly output a thread summary that identifies the determined estimated duration of time before text content of any message of that conversation thread is audibly output.

2. The computing system of claim 1, wherein the instructions are further executable by the logic subsystem to group the unreviewed electronic communications into the plurality of conversation threads.

3. The computing system of claim 1, wherein at least one conversation thread of the plurality of conversation threads includes a plurality of the unreviewed electronic communications that are reply-linked to each other.

4. The computing system of claim 1, wherein the presentation order progresses thread-by-thread through the plurality of conversation threads in a reverse chronological-sequential order based on a most recent unreviewed electronic communication of each of the plurality of conversation threads.

5. The computing system of claim 1, wherein the instructions are further executable by the logic subsystem to:
   receive a subsequent instruction to advance the audio presentation of electronic communications for the recipient; and
   responsive to the subsequent instruction, advance the audio presentation from a current conversation thread to a subsequent conversation thread of the presentation order.

6. The computing system of claim 5, further comprising: an audio input interface by which the subsequent instruction is received as a spoken command.

7. The computing system of claim 1, wherein the instructions are further executable by the logic subsystem to:
   receive a subsequent instruction to perform an action with respect to a conversation thread of the plurality of conversation threads; and
   responsive to the subsequent instruction, applying the action to each electronic communication of the conversation thread.

8. The computing system of claim 7, further comprising: an audio input interface by which the subsequent instruction is received as a spoken command.

9. The computing system of claim 1, wherein the thread summary further identifies a quantity of unreviewed electronic communications of the conversation thread.

10. The computing system of claim 1, wherein the thread summary further identifies a quantity of recipients of the unreviewed electronic communications of the conversation thread.

11. The computing system of claim 1, wherein the thread summary further identifies a subject of the conversation thread.

12. The computing system of claim 1, wherein the presentation order excludes previously reviewed electronic communications.

13. The computing system of claim 1, further comprising:

an audio output interface to output audio of the unreviewed electronic communications via one or more audio speakers.

14. The computing system of claim 1, further comprising: an audio input interface by which the instruction is received as a spoken command.

15. The computing system of claim 1, wherein the estimated duration of time is selected from a plurality of graduated time estimates.

16. An electronic device, comprising:
a storage subsystem having instructions stored thereon executable by one or more computing devices to:
  receive an instruction to initiate an audio presentation of electronic communications for a recipient;
  responsive to the instruction, audibly output unreviewed electronic communications for the recipient according to a presentation order in which the unreviewed electronic communications are grouped into a plurality of conversation threads;
  wherein the presentation order progresses thread-by-thread through the plurality of conversation threads by:
    for each of the plurality of conversation threads, audibly outputting at least a portion of text content of a message of each unreviewed electronic communication of that conversation thread before progressing to another of the plurality of conversation threads,
    for any of the plurality of conversation threads that includes a plurality of unreviewed electronic communications for the recipient, progressing in a chronological-sequential order from an oldest to a most-recent unreviewed electronic communication of that conversation thread, and
    for each of the plurality of conversation threads:
      convert at least the portion of the text content of the message of each unreviewed electronic communication of that conversation thread to audio content,
      determine an estimated duration of time for the computing system to audibly output the unreviewed electronic communications of that conversation thread based on the audio content, and
      audibly output a thread summary that identifies the determined estimated duration of time before text content of any message of that conversation thread is audibly output.

17. The electronic device of claim 16, wherein the estimated duration of time is selected from a plurality of graduated time estimates.

18. A method performed by a computing system of one or more computing devices, the method comprising:
  receiving an instruction to initiate an audio presentation of electronic communications for a recipient;
  responsive to the instruction, audibly outputting unreviewed electronic communications for the recipient according to a presentation order that differs from a chronological order of the unreviewed electronic communications, wherein the unreviewed electronic communications are grouped into a plurality of conversation threads;
  wherein the presentation order progresses thread-by-thread through the plurality of conversation threads by:
    for each of the plurality of conversation threads, audibly outputting at least a portion of text content of a message of each unreviewed electronic communication of that conversation thread before progressing to another of the plurality of conversation threads,
    for any of the plurality of conversation threads that includes a plurality of unreviewed electronic communications for the recipient, progressing in a chronological-sequential order from an oldest to a most-recent unreviewed electronic communication of that conversation thread before audibly outputting a chronological-intermediate unreviewed electronic communication of another conversation thread, and
    for each of the plurality of conversation threads:
      convert at least the portion of the text content of the message of each unreviewed electronic communication of that conversation thread to audio content,
      determine an estimated duration of time for the computing system to audibly output the unreviewed electronic communications of that conversation thread based on the audio content, and
      audibly output a thread summary that identifies the determined estimated duration of time communications of that conversation thread before text content of any message of that conversation thread is audibly output;
  wherein at least one conversation thread of the plurality of conversation threads includes a plurality of the unreviewed electronic communications that are reply-linked to each other.

19. The method of claim 18, further comprising:
  grouping the unreviewed electronic communications into the plurality of conversation threads in which each conversation thread includes any unreviewed electronic communications of the unreviewed electronic communications that are reply-linked to each other; and
  wherein the presentation order progresses thread-by-thread through the plurality of conversation threads in a reverse chronological-sequential order based on a most recent unreviewed electronic communication of each of the plurality of conversation threads.

20. The method of claim 18, wherein the estimated duration of time is selected from a plurality of graduated time estimates.

* * * * *